(12) United States Patent
Itahara et al.

(10) Patent No.: US 11,686,393 B2
(45) Date of Patent: Jun. 27, 2023

(54) DOUBLE ECCENTRIC VALVE

(71) Applicant: AISAN KOGYO KABUSHIKI KAISHA, Obu (JP)

(72) Inventors: Mitsuyoshi Itahara, Obu (JP); Kazuhiro Yoneshige, Nagoya (JP); Hiroshi Kawazoe, Kariya (JP); Makoto Fukui, Nagoya (JP); Sadatsugu Nagata, Aichi-gun (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/592,682

(22) Filed: Feb. 4, 2022

(65) Prior Publication Data

US 2022/0170553 A1 Jun. 2, 2022

Related U.S. Application Data

(62) Division of application No. 16/613,232, filed as application No. PCT/JP2018/021158 on Jun. 1, 2018, now Pat. No. 11,274,750.

(30) Foreign Application Priority Data

Jul. 11, 2017 (JP) .............................. JP2017-135584
Jan. 8, 2018 (JP) .............................. JP2018-000908

(51) Int. Cl.
 *F16K 1/226* (2006.01)
(52) U.S. Cl.
 CPC .................................. *F16K 1/226* (2013.01)

(58) Field of Classification Search
 CPC ...... F16K 1/2262; F16K 1/226; F16K 1/2041; F16K 1/205
 See application file for complete search history.

(56) References Cited

U.S. PATENT DOCUMENTS

| 3,596,876 A | 8/1971 | Scaramucci |
| 3,997,142 A | 12/1976 | Broadway |
| 4,284,264 A | 8/1981 | Hubertson |
| 4,411,405 A * | 10/1983 | Barbe ..................... F16K 1/226 251/306 |
| 4,418,889 A | 12/1983 | Krause |
| 4,480,815 A | 11/1984 | Kreij |

(Continued)

FOREIGN PATENT DOCUMENTS

| CN | 105874250 A | 8/2016 |
| CN | 206017777 U | 3/2017 |

(Continued)

OTHER PUBLICATIONS

Aug. 28, 2018 International Search Report issued in International Patent Application No. PCT/JP2018/021158.

(Continued)

*Primary Examiner* — Hailey K. Do
(74) *Attorney, Agent, or Firm* — Oliff PLC

(57) ABSTRACT

In a double eccentric valve, a valve seat or valve body includes a rubber seal part in which a seat surface or seal surface is formed. An interference between the valve seat and the valve body is made minimum at a position of a rotary-shaft-directional end of the valve body in the radial direction of the valve body which is parallel to an extending direction of the axis of a rotary shaft.

1 Claim, 19 Drawing Sheets

(56) References Cited

U.S. PATENT DOCUMENTS

| | | | |
|---|---|---|---|
| 6,149,130 | A | 11/2000 | Thurston et al. |
| 6,202,983 | B1 | 3/2001 | Hailman et al. |
| 2011/0272613 | A1 | 11/2011 | Watanuki et al. |
| 2016/0290514 | A1 | 10/2016 | Misumi et al. |
| 2017/0152953 | A1 | 6/2017 | Misumi et al. |
| 2018/0224000 | A1 | 8/2018 | Misumi et al. |

FOREIGN PATENT DOCUMENTS

| | | | | |
|---|---|---|---|---|
| DE | 102009006823 A1 | * | 8/2010 | ......... B60H 1/00678 |
| JP | S58-130164 U | | 9/1983 | |
| JP | S62-044215 Y2 | | 11/1987 | |
| JP | 2001-343075 A | | 12/2001 | |
| WO | 2009/069240 A1 | | 6/2009 | |
| WO | 2016/002599 A1 | | 1/2016 | |

OTHER PUBLICATIONS

Jan. 14, 2020 International Preliminary Report on Patentability issued in International Patent Application PCT/JP2018/021158.
Apr. 25, 2021 Office Action issued in Chinese Patent Application No. 201880046252.4.
Jul. 13, 2021 Office Action issued in Japanese Patent Application No. 2018-000908.

* cited by examiner

FIG. 14
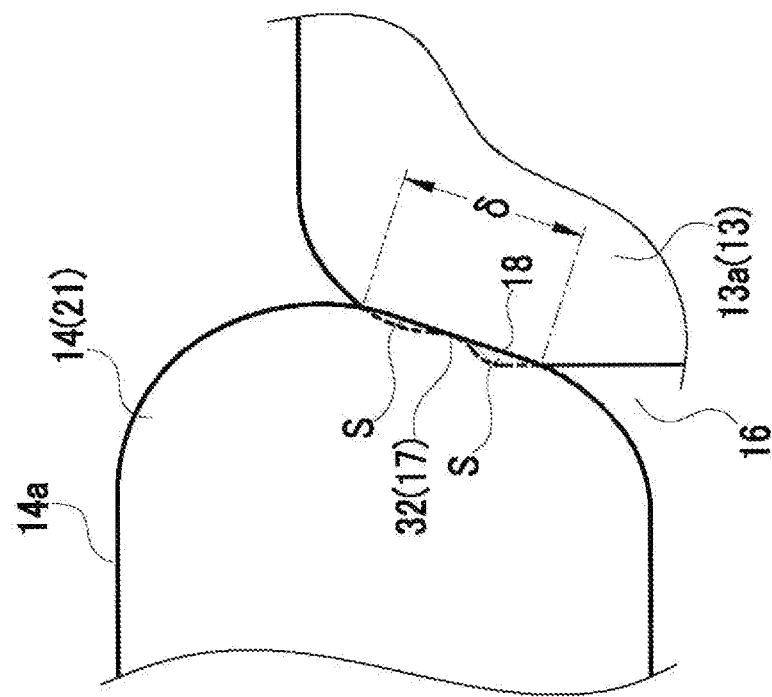
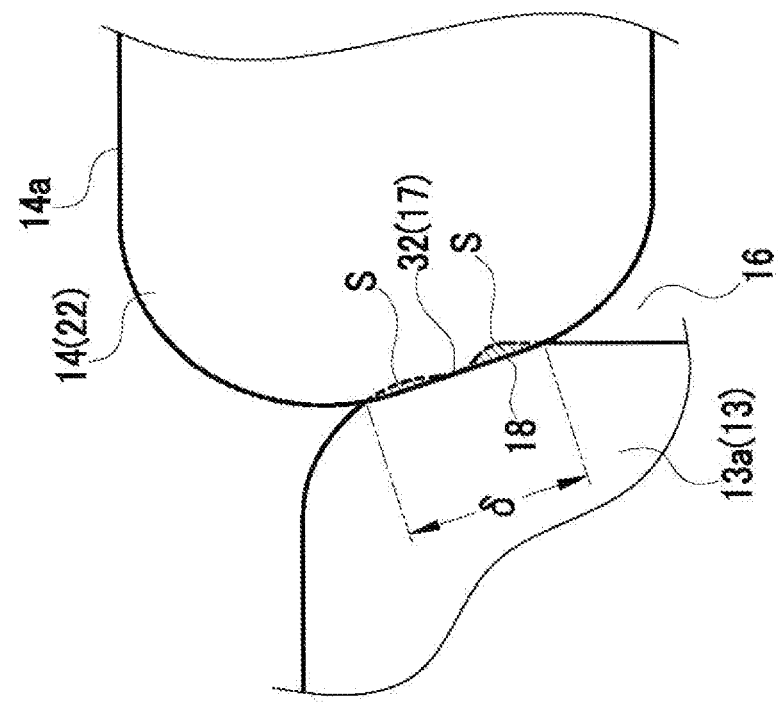

DOUBLE ECCENTRIC VALVE

CROSS-REFERENCE TO RELATED APPLICATIONS

This is a Division of U.S. application Ser. No. 16/613,232 filed on Nov. 13, 2019, which is a National Stage Application of PCT International Patent Application No. PCT/JP2018/021158 filed on Jun. 1, 2018, and claiming the priority of Japanese Patent Applications No. 2017-135584 filed on Jul. 11, 2017 and No. 2018-000908 filed on Jan. 8, 2018, the entire contents of which are herewith incorporated by reference.

TECHNICAL FIELD

The present disclosure relates to a double eccentric valve configured such that a valve element is placed with its rotation center positioned eccentrically from a center of a valve hole of a valve seat, and a sealing surface of the valve element is positioned eccentrically from the rotation center of the valve element.

BACKGROUND ART

As one conventional art, there is a double eccentric valve as disclosed in Patent document 1. This double eccentric valve is provided with a valve hole and a valve seat including an annular seat surface formed along an edge of the valve hole, a valve element formed, on its outer periphery, with an annular seal surface which faces the seat surface, and a rotary shaft for rotating the valve element. The axis (the central axis) of the rotary shaft extends in parallel with a radial direction of the valve element and the valve hole and is placed eccentrically in a radial direction of the valve hole from the center of the valve hole. The seal surface of the valve element is placed eccentrically from the axis of the rotary shaft in a direction in which the axis of the valve element extends. In the thus configured double eccentric valve, when the valve element is rotated about the axis of the rotary shaft, the seal surface is movable between a fully closed position at which the seal surface is in surface contact with the seat surface and a fully open position at which the seal surface is furthest away from the seat surface.

RELATED ART DOCUMENTS

Patent Documents

Patent Document 1: WO2016/002599A1

SUMMARY OF INVENTION

Problems to be Solved by the Disclosure

When the foregoing double eccentric valve is provided with a rubber seal part in the valve seat as a portion which can contact with the valve element in order to enhance the sealing property (the sealing strength) between the valve seat and the valve element, a sliding resistance that occurs between the valve seat and the valve element during valve opening/closing operation may increase due to the frictional force of the rubber seal part. This may cause eccentrical abrasion of the rubber seal part, resulting in deterioration in durability of the rubber seal part and thus the sealing property between the valve seat and the valve element may deteriorate.

The present disclosure has been made in view of the circumstances to solve the above problems and has a purpose to provide a double eccentric valve capable of reducing sliding resistance which may occur between a valve seat and a valve element.

Means of Solving the Problems

To achieve the above purpose, one aspect of the disclosure provides a double eccentric valve including: a valve seat including a valve hole and an annular seat surface formed along an edge of the valve hole; a valve element having a circular disc shape and including an outer periphery formed with an annular seal surface corresponding to the seat surface; and a rotary shaft configured to rotate the valve element, the rotary shaft having an axis that extends in parallel with a radial direction of the valve element and the valve hole, the rotary shaft being positioned eccentrically from a center of the valve hole in a radial direction of the valve hole, the seal surface being positioned eccentrically from the axis of the rotary shaft toward an extending direction of an axis of the valve element, and the valve element being configured to rotate about the axis of the rotary shaft to move between a fully closed position where the seal surface is in surface contact with the seat surface and a fully open position where the seal surface is furthest away from the seat surface, wherein either the valve seat or the valve element is provided with a rubber seal part formed with either the seat surface or the seal surface, and the valve seat and the valve element are configured to make an interference between the valve seat and the valve element minimum at a position of a rotary-shaft-directional end of the valve element in the radial direction of the valve element, which is a direction parallel to an extending direction of the axis of the rotary shaft.

The above aspect can reduce the interference between the valve seat and the valve element at the position of a portion (i.e., the rotary-shaft-directional end of the valve element) where the valve element and the valve seat come in contact with each other for a longest time during a valve opening/closing operation. This reduced interference results in a reduced range of contact between the valve seat and the valve element during the valve opening/closing operation. Accordingly, the sliding range of the valve seat and the valve element can be reduced, leading to a reduction in the sliding resistance which occurs between the valve seat and the valve element.

In the foregoing aspect, preferably, the valve seat is provided with the rubber seal part including the seat surface, and the valve element is provided with a cutout portion at the position of the rotary-shaft-directional end.

The foregoing aspect provided with the cutout portion can reduce the interference with respect to the valve seat at the position of a portion of the valve element that contacts with the valve seat for a longest time during a valve opening/closing operation. This reduced interference results in a reduced area of contact with the valve seat during the valve opening/closing operation. Accordingly, the sliding range of the valve seat and the valve element can be reduced, leading to a reduction in the sliding resistance which occurs between the valve seat and the valve element.

In the foregoing aspect, preferably, the valve element has an elliptical shape with its minor axis extending in the direction parallel to the extending direction of the axis of the rotary shaft.

The foregoing aspect can gradually reduce the interference between the valve seat and the valve element along a circumferential direction of the valve element, thereby further reducing the range of contact between the valve seat and the valve element during the valve opening/closing operation. Accordingly, the sliding range of the valve seat and the valve element can be further reduced, leading to a reduction in the sliding resistance which occurs between the valve seat and the valve element.

To achieve the aforementioned problems, another aspect of the present disclosure provides a double eccentric valve including: a valve seat including a valve hole and an annular seat surface formed along an edge of the valve hole; a valve element having a circular disc shape and including an outer periphery formed with an annular seal surface corresponding to the seat surface; and a rotary shaft configured to rotate the valve element, the rotary shaft having an axis that extends in parallel with a radial direction of the valve element and the valve hole, the rotary shaft being positioned eccentrically from a center of the valve hole in a radial direction of the valve hole, the seal surface being positioned eccentrically from the axis of the rotary shaft toward an extending direction of an axis of the valve element, and the valve element being configured to rotate about the axis of the rotary shaft to move between a fully closed position where the seal surface is in surface contact with the seat surface and a fully open position where the seal surface is furthest away from the seat surface, wherein either the valve seat or the valve element is provided with a rubber seal part formed with either the seat surface or the seal surface, and the seat surface or the seal surface in the rubber seal part includes a groove.

The above aspect can reduce the interference area of the rubber seal part with respect to the valve element or the valve seat when the valve seat and the valve element contact each other. This configuration can reduce the repulsion force of the rubber seal part with respect to the valve element or the valve seat, leading to a reduction in the sliding resistance which occurs between the valve seat and the valve element while providing a sufficient sealing width between the valve seat and the valve element.

In the foregoing aspect, preferably, the valve element includes a first side part and a second side part divided by a boundary defined by a virtual plane extending from an axis of the rotary shaft in parallel with an extending direction of the axis of the valve element, when the valve element is rotated in a valve closing direction, the first side part rotates from an inside toward an outside of the valve hole while the second side part rotates from the outside toward the inside of the valve hole, the rubber seal part is provided to the valve seat, the groove extends entirely in a circumferential direction of the valve seat, and a portion of the groove located on a side where the first side part slides is placed at a position more inside the valve hole in a direction of a central axis of the valve hole relative to a portion of the groove located on a side where the second side part slides.

In the above aspect, the position of the groove varies with location in the circumferential direction of the valve seat can reduce the interference when the valve element and the rubber seal part of the valve seat start to contact with each other during the valve closing operation. In this manner, the above configuration can reduce the sliding resistance which occurs between the valve seat and the valve element before the fully closed state is reached during the valve closing operation. Even during a valve opening operation, the above configuration can reduce the sliding range of the valve seat and the valve element, leading to a reduction in the sliding resistance which occurs between the valve seat and the valve element.

To achieve the aforementioned problems, another aspect of the present disclosure provides a double eccentric valve including: a valve seat including a valve hole and an annular seat surface formed along an edge of the valve hole; a valve element having a circular disc shape and including an outer periphery formed with an annular seal surface corresponding to the seat surface; and a rotary shaft configured to rotate the valve element, the rotary shaft having an axis that extends in parallel with a radial direction of the valve element and the valve hole, the rotary shaft being positioned eccentrically from a center of the valve hole in a radial direction of the valve hole, the seal surface being positioned eccentrically from the axis of the rotary shaft toward an extending direction of an axis of the valve element, and the valve element being configured to rotate about the axis of the rotary shaft to move between a fully closed position where the seal surface is in surface contact with the seat surface and a fully open position where the seal surface is furthest away from the seat surface, wherein the valve element includes a first side part and a second side part divided by a boundary defined by a virtual plane extending from an axis of the rotary shaft in parallel with an extending direction of the axis of the valve element, when the valve element is rotated in a valve closing direction, the first side part rotates from an inside toward an outside of the valve hole while the second side part rotates from the outside toward the inside of the valve hole, the valve element is provided with a rubber seal part including the seal surface, and a portion of the rubber seal part located close to the second side part is configured to enter in the valve hole by a smaller amount during full closing than a portion of the rubber seal part located close to the first side part.

The foregoing aspect in which the rubber seal part can enter in the valve hole by a reduced distance during full closing, so that the amount of contact of the rubber seal part with the valve seat is reduced. During a valve opening/closing operation, the above configuration can reduce the sliding range of the valve seat and the valve element. This enables a reduction in the sliding resistance which occurs between the valve seat and the valve element.

In the foregoing aspect, preferably, the rubber seal part is attached to an outer periphery of the valve element in the radial direction so that a central axis of the rubber seal part is oblique to the axis of the valve element, and a portion of the rubber seal part located close to the second side part is formed at a position outside the valve hole during full closing in a direction of the axis of the valve element than a portion of the rubber seal part located close to the first side part.

In the foregoing aspect, preferably, the rubber seal part is attached to an outer periphery of the valve element in the radial direction so that a central axis of the rubber seal part coincides with the axis of the valve element, and a portion of the rubber seal part close to the second side part is smaller in thickness in a direction of the central axis of the rubber seal part than a portion of the rubber seal part close to the first side part.

To achieve the aforementioned problems, another aspect of the present disclosure provides a double eccentric valve including: a valve seat including a valve hole and an annular seat surface formed along an edge of the valve hole; a valve element having a circular disc shape and including an outer periphery formed with an annular seal surface corresponding to the seat surface; and a rotary shaft configured to rotate the valve element, the rotary shaft having an axis that extends in parallel with a radial direction of the valve element and the valve hole, the rotary shaft being positioned eccentrically from a center of the valve hole in a radial direction of the valve hole, the seal surface being positioned eccentrically from the axis of the rotary shaft toward an extending direction of an axis of the valve element, and the valve element being configured to rotate about the axis of the rotary shaft to move between a fully closed position where the seal surface is in surface contact with the seat surface and a fully open position where the seal surface is furthest away from the seat surface,
wherein at least one of the seat surface and the seal surface includes an asperity or a groove.

The above aspect can reduce the area of contact between the valve seat and the valve element, leading to a reduction in the sliding resistance which occurs between the valve seat and the valve element.

In the foregoing aspect, preferably, either the valve seat or the valve element is provided with a rubber seal part including the seat surface or the seal surface, and the seat surface or the seal surface of either one of the valve seat or the valve element, the one being not provided with the rubber seal part, includes the asperity or the groove.

The above aspect in which either the valve seat or the valve element is provided with the rubber seal part can reduce the area of contact between the valve seat and the valve element, leading to a reduction in the sliding resistance which occurs between the valve seat and the valve element.

In the foregoing aspect, preferably, the asperity or the groove is formed in larger numbers for a lower request value for sliding resistance of the valve element with respect to the valve seat.

The above aspect in which more numerous asperities or grooves are formed to reduce the area of contact between the valve seat and the valve element can reduce the sliding resistance which occurs between the valve seat and the valve element.

In the foregoing aspect, preferably, the valve seat and the valve element are configured to provide a linear contact area within a sliding region of the valve seat and the valve element in a cross-section of the valve seat and the valve element in an axial direction when the valve element is in the fully closed position.

The above aspect in which a fluid is blocked off in a region where the valve seat and the valve element are in linear contact with each other in the fully closed state can prevent leakage of the fluid.

Effects of the Invention

A double eccentric valve of the present disclosure can reduce the sliding resistance which occurs between a valve seat and a valve element.

BRIEF DESCRIPTION OF THE DRAWINGS

FIG. 14 is a view corresponding to a C-C cross-section and a D-D cross-section in FIG. 7 in Example 1 of a third embodiment;

MODE FOR CARRYING OUT THE INVENTION

A detailed description of a preferred embodiment of a double eccentric valve of the present disclosure embodied in a flow control valve will now be given referring to the accompanying drawings.

First Embodiment

Figure 1:
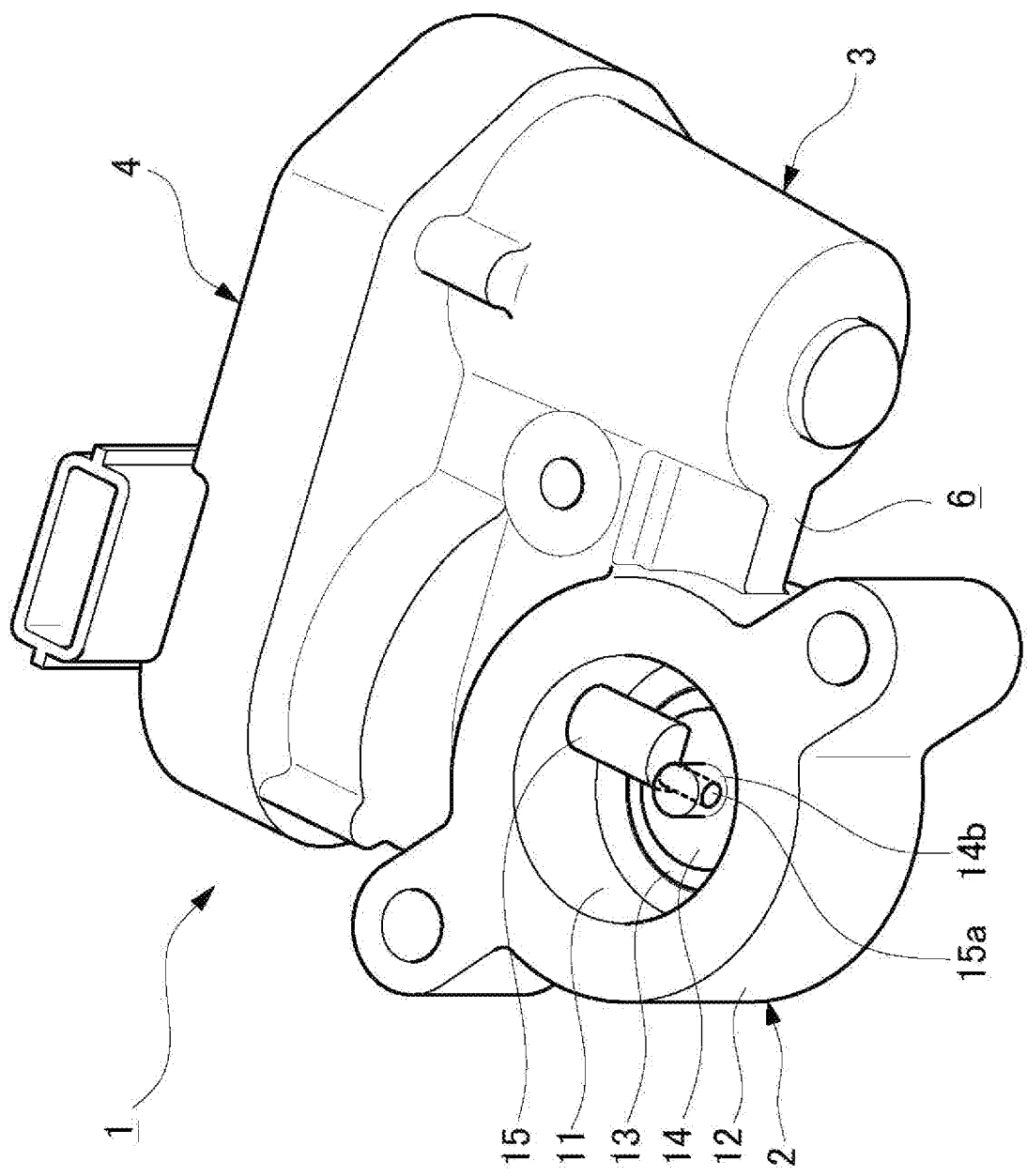
FIG. 1 is a perspective view showing one example of a flow control valve provided with a double eccentric valve of the present disclosure.
Figure 2:
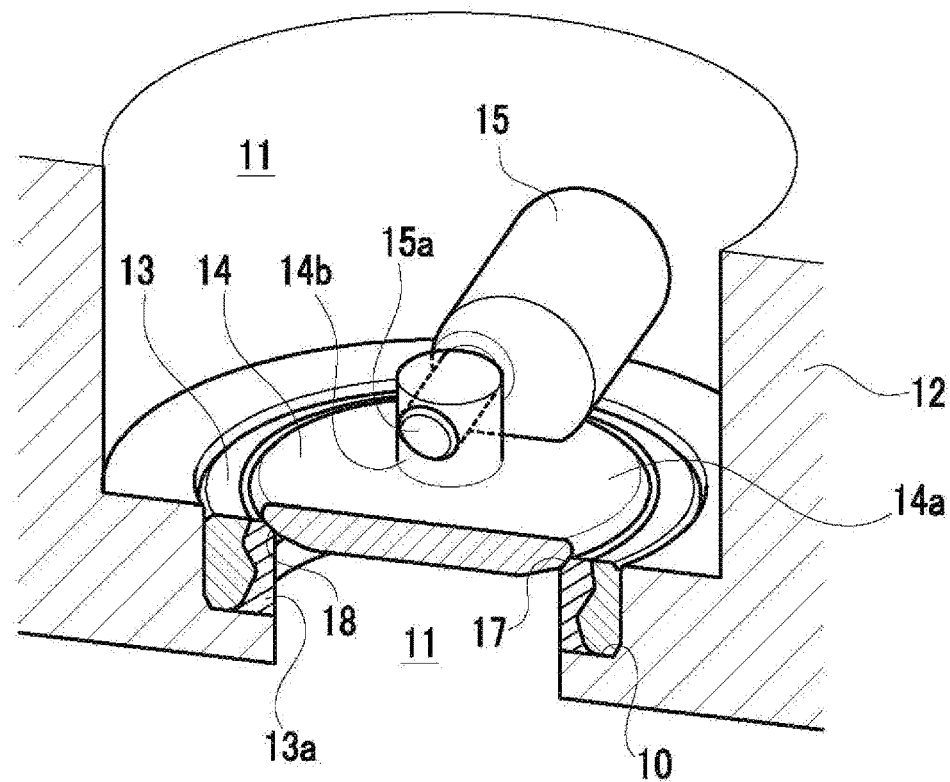
FIG. 2 is a perspective view showing a valve section in a fully closed state including a partially cutaway view.
Figure 3:
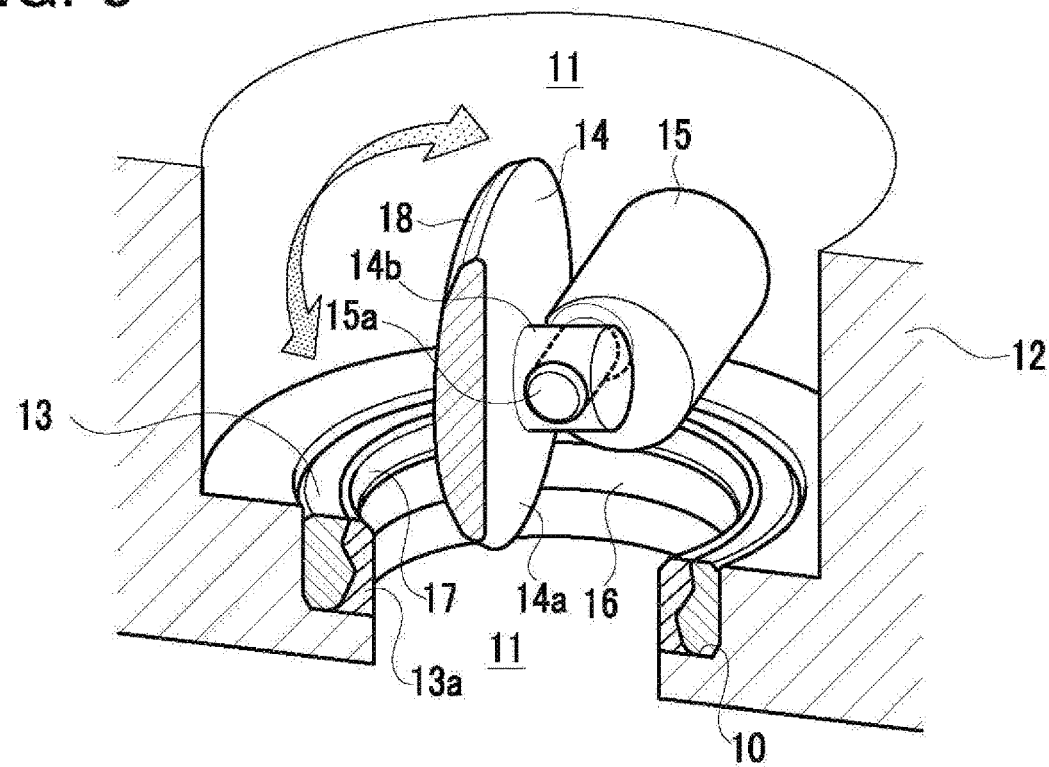
FIG. 3 is a perspective view showing the valve section in a fully open state including the partially cutaway view.
Figure 4:
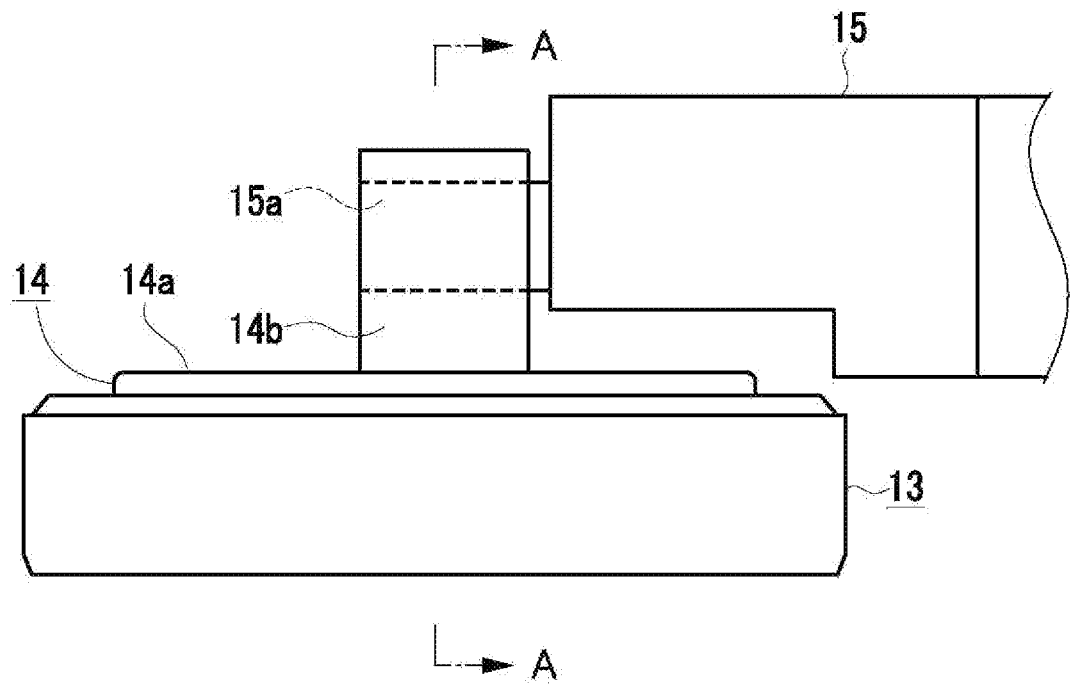
FIG. 4 is a side view showing a valve seat, a valve element, and a rotary shaft in a valve closed state.

A first embodiment will be first described. As shown in FIG. 1, a flow control valve 1 includes a valve section 2 made up of a double eccentric valve, a motor section 3 including a built-in motor, and a speed-reducing mechanical section 4 including a plurality of gears built therein. As shown in FIGS. 2 and 3, the valve section 2 includes a pipe part 12 made of metal having a flow passage 11 in which a fluid flows. In this flow passage, a valve seat 13, a valve element 14, and a rotary shaft 15 are placed. The inner shape of the flow passage 11, the outer shape of the valve seat 13, and the outer shape of the valve element 14 are each circular or nearly circular in plan view. The rotary shaft 15 is arranged to receive the torque of the motor via the plurality of gears. In the present embodiment, the pipe part 12 having the flow passage 11 corresponds to a part of a housing 6. This housing 6 covers the motor of the motor section 3 and the plurality of gears of the speed-reducing mechanism section 4. The housing 6 is made of metal, such as aluminum.

The flow passage 11 is formed with a step portion 10, on which the valve seat 13 is mounted. The valve seat 13 has an annular shape and includes a circular or nearly circular valve hole 16 at the center. The valve hole 16 is formed, along its edge, with an annular seat surface 17. In the present embodiment, the valve seat 13 is provided with a rubber seal part 13a in which the seat surface 17 is formed. The valve element 14 has a circular-disk shape and includes an outer periphery formed with an annular seal surface 18 corresponding to the seat surface 17. The valve element 14 is fixed to the rotary shaft 15 and rotatable together with the rotary shaft 15.

Figure 5:
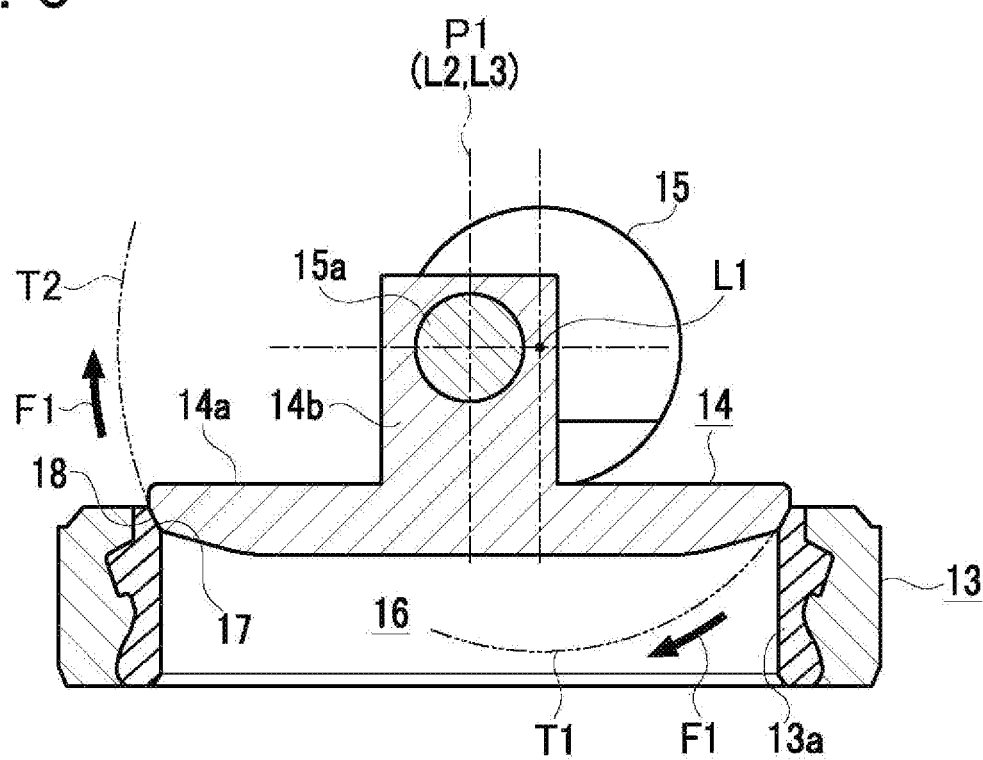
FIG. 5 is a A-A cross-sectional view in FIG. 4.
Figure 6:
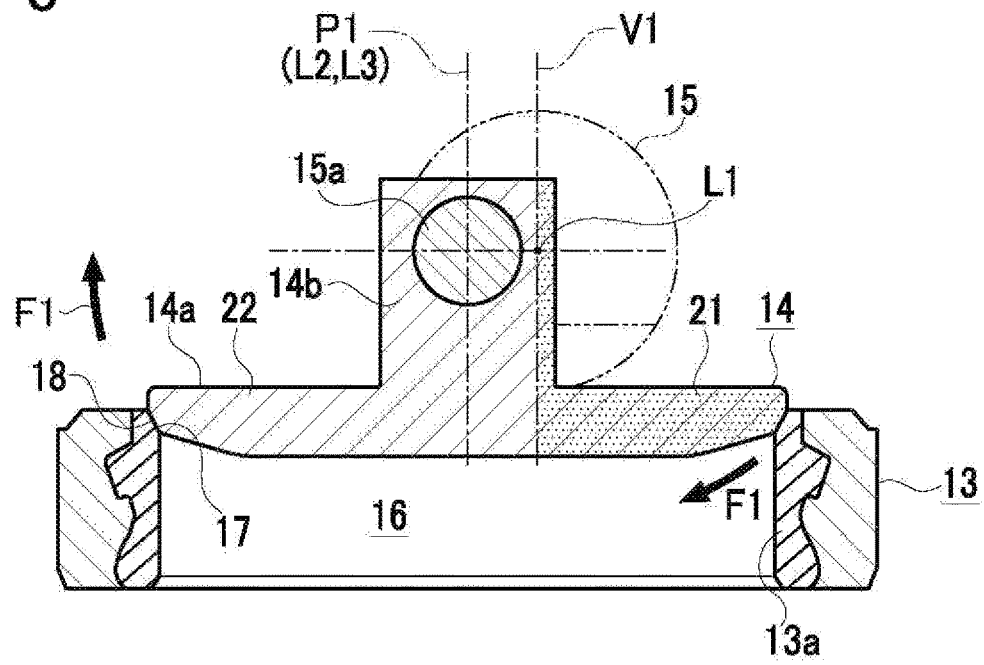
FIG. 6 is a cross-sectional view showing the valve seat and the valve element in a fully closed state.
Figure 7:
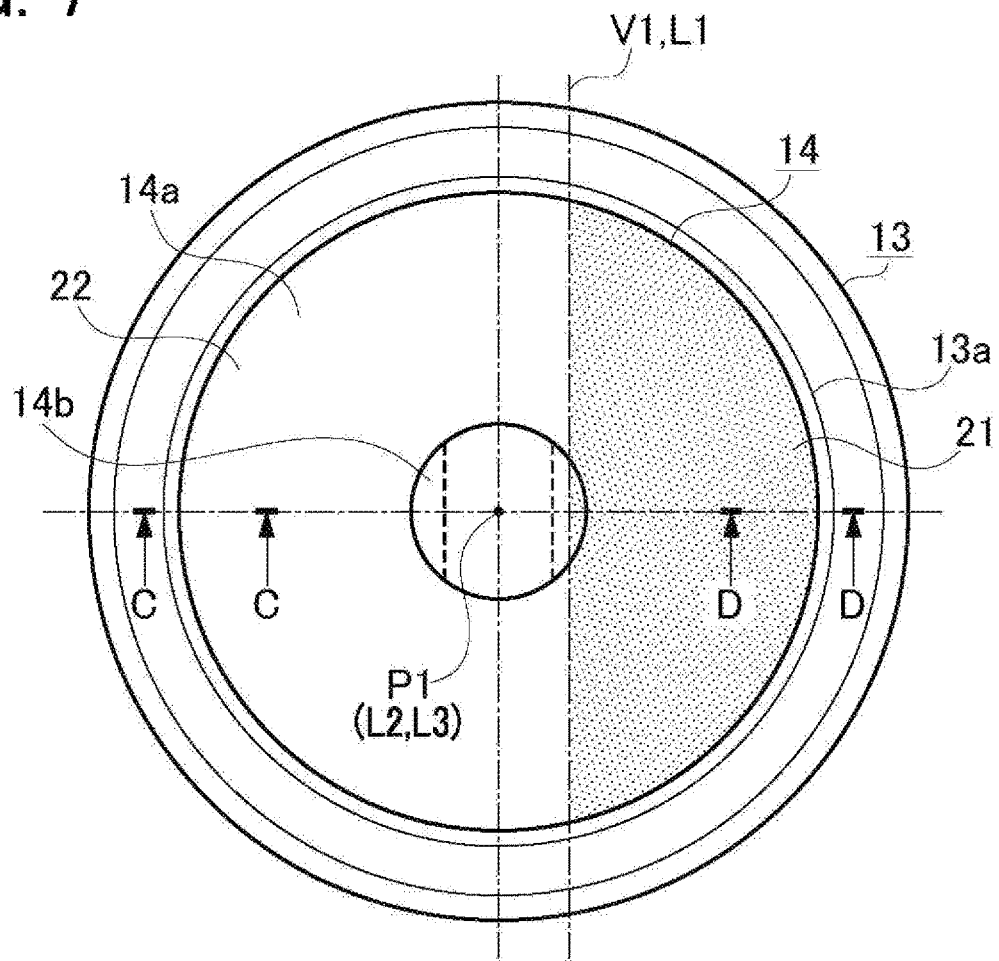
FIG. 7 is a plan view of the valve seat and the valve element in the fully closed state.

As shown in FIGS. 5 to 7, an axis L1 of the rotary shaft 15 extends in parallel with a radial direction of the valve element 14 and a radial direction of the valve hole 16 and is placed eccentrically in a radial direction of the valve hole 16 from the center P1 of the valve hole 16. The seal surface 18 of the valve element 14 is placed eccentrically from the axis L1 of the rotary shaft 15 toward an extending direction of an axis L2 of the valve element 14. When the valve element 14 is rotated about the axis L1 of the rotary shaft 15, the seal surface 18 of the valve element 14 is movable between a fully closed position (see FIG. 2) where the seal surface 18 is in surface contact with the seat surface 17 of the valve seat 13 and a fully open position (see FIG. 3) where the seal surface 18 is furthest away from the seat surface 17.

In the present embodiment, in FIG. 5, when the valve element 14 starts to rotate in a valve opening direction (a direction indicated by arrows F1 in FIG. 5, that is, a clockwise direction in FIG. 5) from the fully closed position, the seal surface 18 of the valve element 14 simultaneously starts to separate from the seat surface 17 and move along rotational paths T1 and T2 about the axis L1 of the rotary shaft 15.

As shown in FIGS. 6 and 7, the valve element 14 is divided into two portions, i.e., a first side part 21 (a shaded area in FIGS. 6 and 7) and a second side part 22 (an unshaded area in FIGS. 6 and 7) by a boundary defined by a virtual plane V1 extending from the axis L1 of the rotary shaft 15 and in parallel with an extending direction of a central axis L3 of the valve hole 16 (the axis L2 of the valve element 14). When the valve element 14 is rotated in the valve opening direction indicated by the arrows F1 from the fully closed position shown in FIG. 6, the first side part 21 rotates toward the inside of the valve hole 16 and the second side part 22 rotates toward the outside of the valve hole 16. When the valve element 14 is rotated in the valve closing direction (an opposite direction to the direction indicated by the arrows F1) from the valve open position (see FIG. 3) toward the fully closed position shown in FIG. 6, the first side part 21 rotates from the inside toward the outside of the valve hole 16 and the second side part 22 rotates from the outside toward the inside of the valve hole 16.

As shown in FIGS. 4 to 7, the valve element 14 includes a fixed portion 14b having a mountain-like shape that protrudes from a plate surface 14a on an upper side of the valve element 14 and is fixed to the rotary shaft 15. This fixed portion 14b is fixed to the rotary shaft 15 through a pin 15a protruding from a distal end of the rotary shaft 15 and at a position displaced in the radial direction of the rotary shaft 15 from the axis L1 of the rotary shaft 15. As shown in FIGS. 5 to 7, furthermore, the fixed portion 14b is placed on the axis L2 of the valve element 14 and the valve element 14 including the fixed portion 14b has a bilaterally symmetrical shape relative to the axis L2 of the valve element 14.

Figure 8:
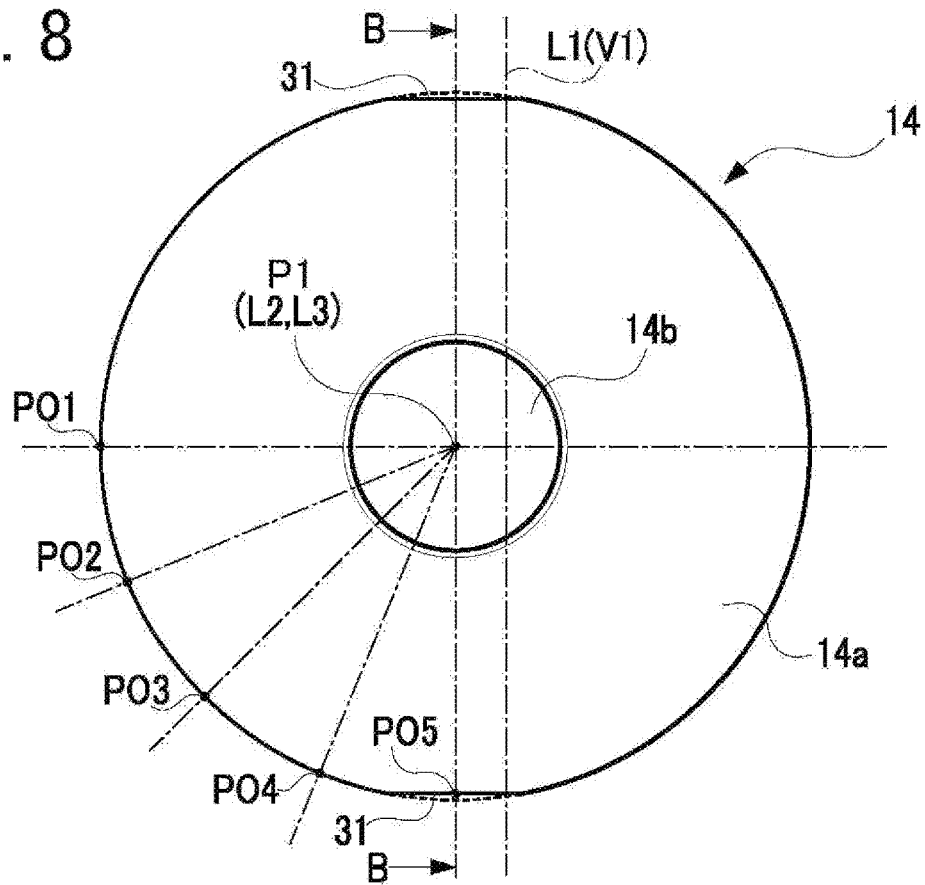
FIG. 8 is a plan view of the valve element in a first embodiment.
Figure 9:
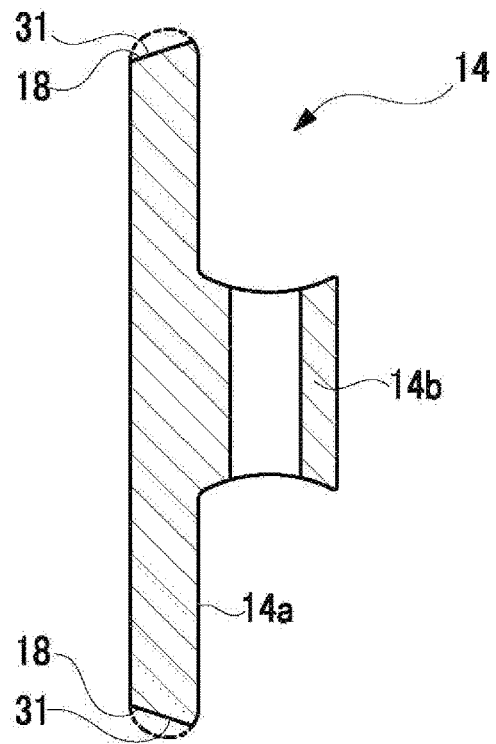
FIG. 9 is a B-B cross-sectional view in FIG. 8.

In the present embodiment, an end face of the valve element 14 is cut away. Specifically, as shown in FIGS. 8 and 9, the valve element 14 is provided with a cut portion 31 (a cutout portion) at a position (a valve position PO5) of each end (a rotary-shaft-directional end) of the valve element 14 in the radial direction thereof, which is a direction parallel to the extending direction of the axis L1 of the rotary shaft 15. This valve element 14 is cut away at both end faces in the axis L1 direction of the rotary shaft 15 (a vertical direction in FIG. 8). Such a valve element 14 has a perfect circular shape with both radial-direction ends cut away. In one example, in which the diameter of the valve element 14 is 30 mm, the maximum cut width of the valve element 14 in the radial direction at each cut portion 31 is set to 0.05 mm.

Figure 10:
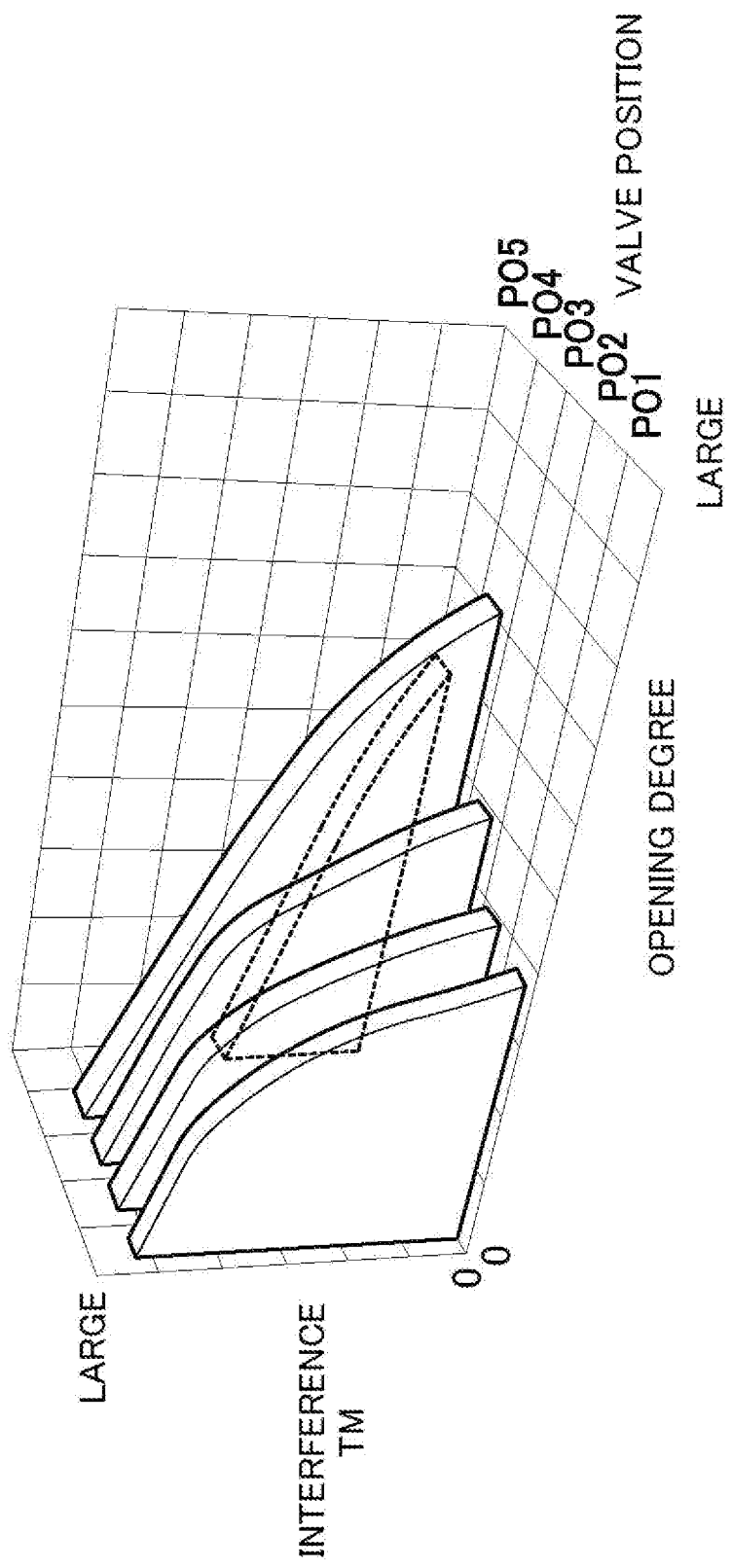
FIG. 10 is a diagram showing an interference with respect to the valve seat at each valve position in the first embodiment.

The above configuration makes an interference TM between the valve seat 13 (specifically, the rubber seal part 13a) and the valve element 14 (hereinafter, simply referred to as an "interference TM") minimum at the valve position PO5. Specifically, as shown in FIG. 10, the interference TM (indicated by a dotted line in FIG. 10) at the valve position PO5 is smaller than interferences TM (indicated by solid lines in FIG. 10) at valve positions PO1, PO2, PO3, and PO4 (see FIG. 8).

Herein, the valve position PO1 is a position of an end of the valve element 14 in a radial direction thereof corresponding to a direction perpendicular to the extending direction of the axis L1 of the rotary shaft 15, as shown in FIG. 8. The valve position PO5 is a position of an end of the valve element 14 in the radial direction thereof corresponding to a direction parallel to the extending direction of the axis L1 of the rotary shaft 15. The valve positions PO2, PO3, and PO4 are positions displaced from one another in a circumferential direction of the valve element 14 between the valve position PO1 and the valve position PO5.

In the present embodiment described as above, the valve element 14 is provided with the cut portion 31, thereby reducing the interference TM at a position (the valve position PO5) of a contact portion (the rotary-shaft-directional end of the valve element 14) where the valve element 14 and the valve seat 13 contact with each other for a longest time during valve opening/closing operation. This reduced interference TM can result in a reduced range of contact between the valve seat 13 and the valve element 14 during valve opening/closing operation. Accordingly, a sliding range of the valve seat 13 and the valve element 14 can be reduced, leading to a reduction in sliding resistance which occurs between the valve seat 13 and the valve element 14.

Figure 27:
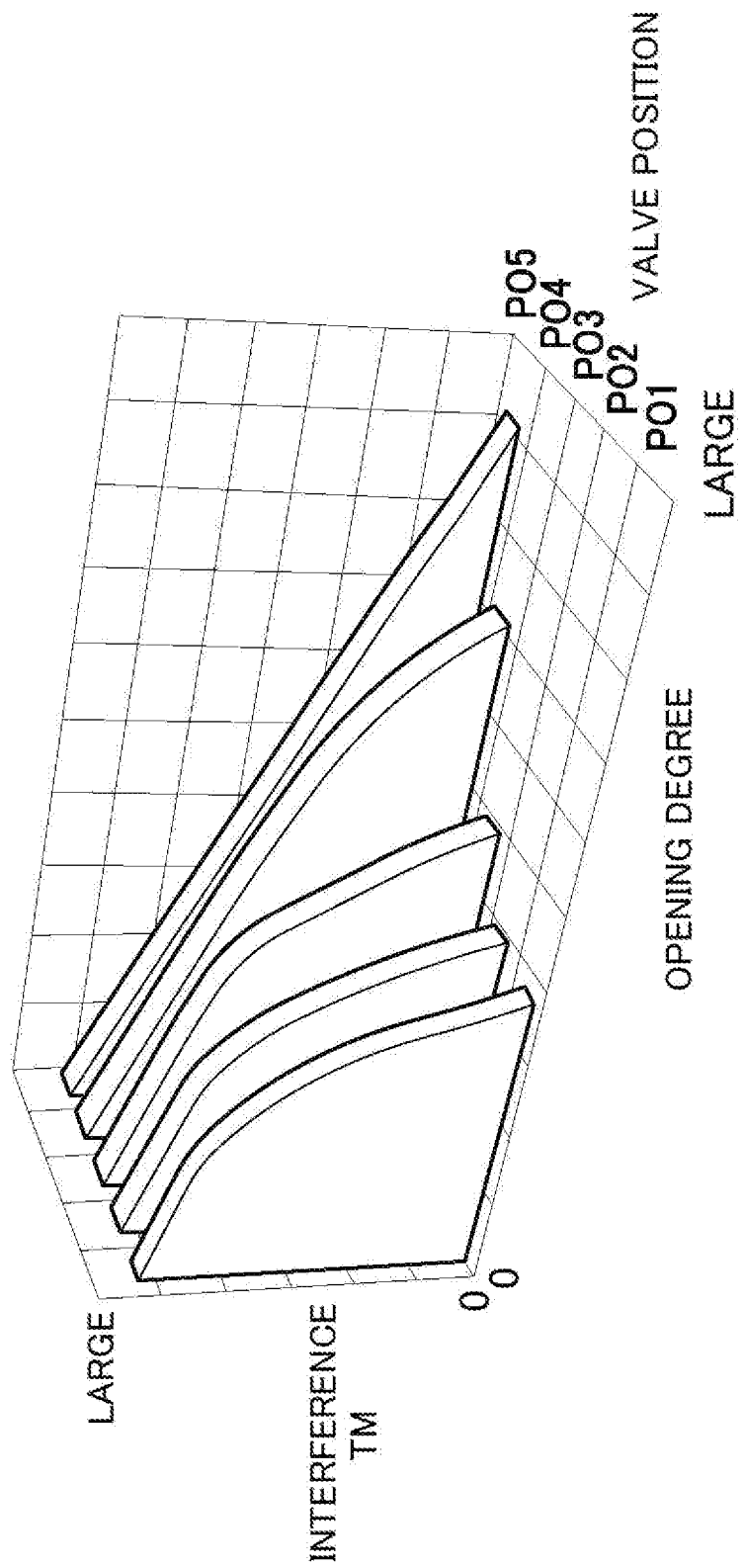
FIG. 27 is a diagram showing an interference with respect to a valve seat at each valve position in a comparison embodiment.

In a comparative embodiment in which a valve element 14 does not include a cut portion 31 as shown in FIG. 27, an interference TM at a valve position PO5 is made large and thus a whole-circumferential-open opening degree becomes large. In the first embodiment, however, the interference TM at the valve position PO5 is small as shown in FIG. 10 as compared with that in the comparative Example and therefore the whole-circumferential-open opening degree becomes small. This whole-circumferential-open opening degree represents an opening degree when an interference TM is 0 because the valve element 14 does not contact, over its entire circumference, with the valve seat 13.

Second Embodiment

Second through sixth embodiments will be described below, in which similar or identical parts or components to those in the first embodiment are assigned the same reference signs as in the first embodiment and their details are not elaborated upon here. The following description will be given with a focus on differences from the first embodiment. First, the second embodiment will be described below.

Figure 11:
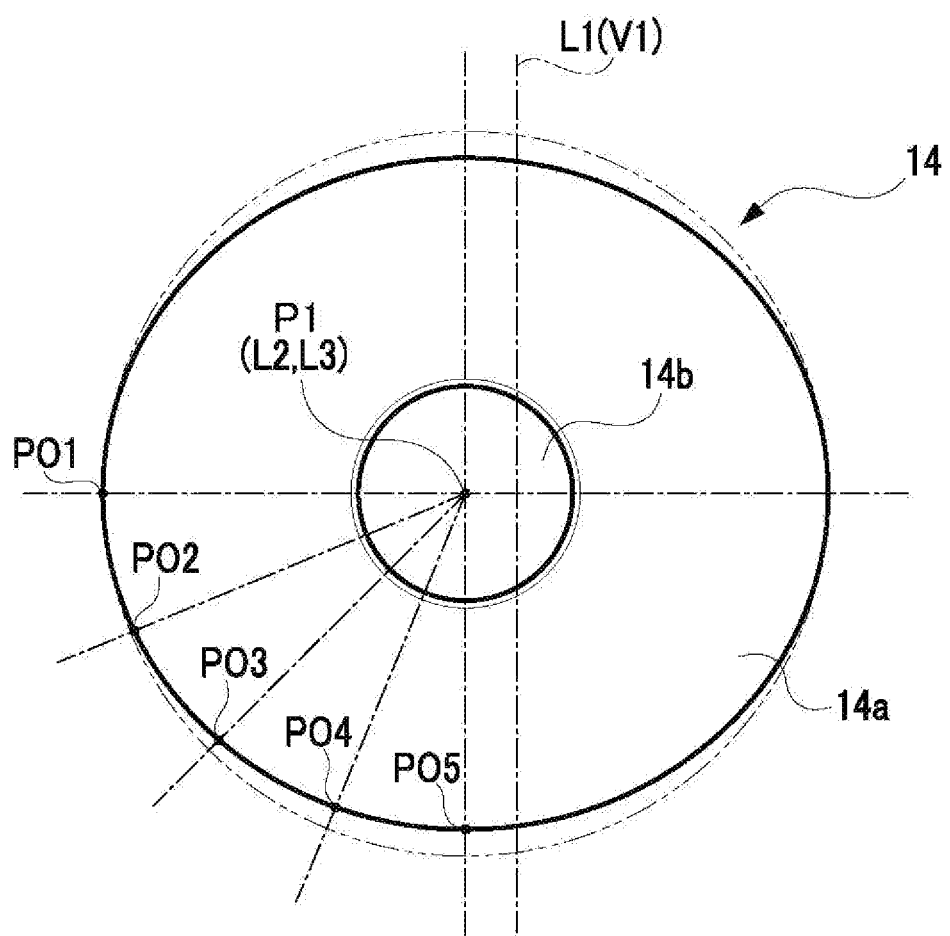
FIG. 11 is a plan view of a valve element in a second embodiment.

In the present embodiment, the valve element 14 has an elliptical shape with its minor axis extending in a direction parallel to the extending direction of the axis L1 of the rotary shaft 15 as shown in FIG. 11.

Figure 12:
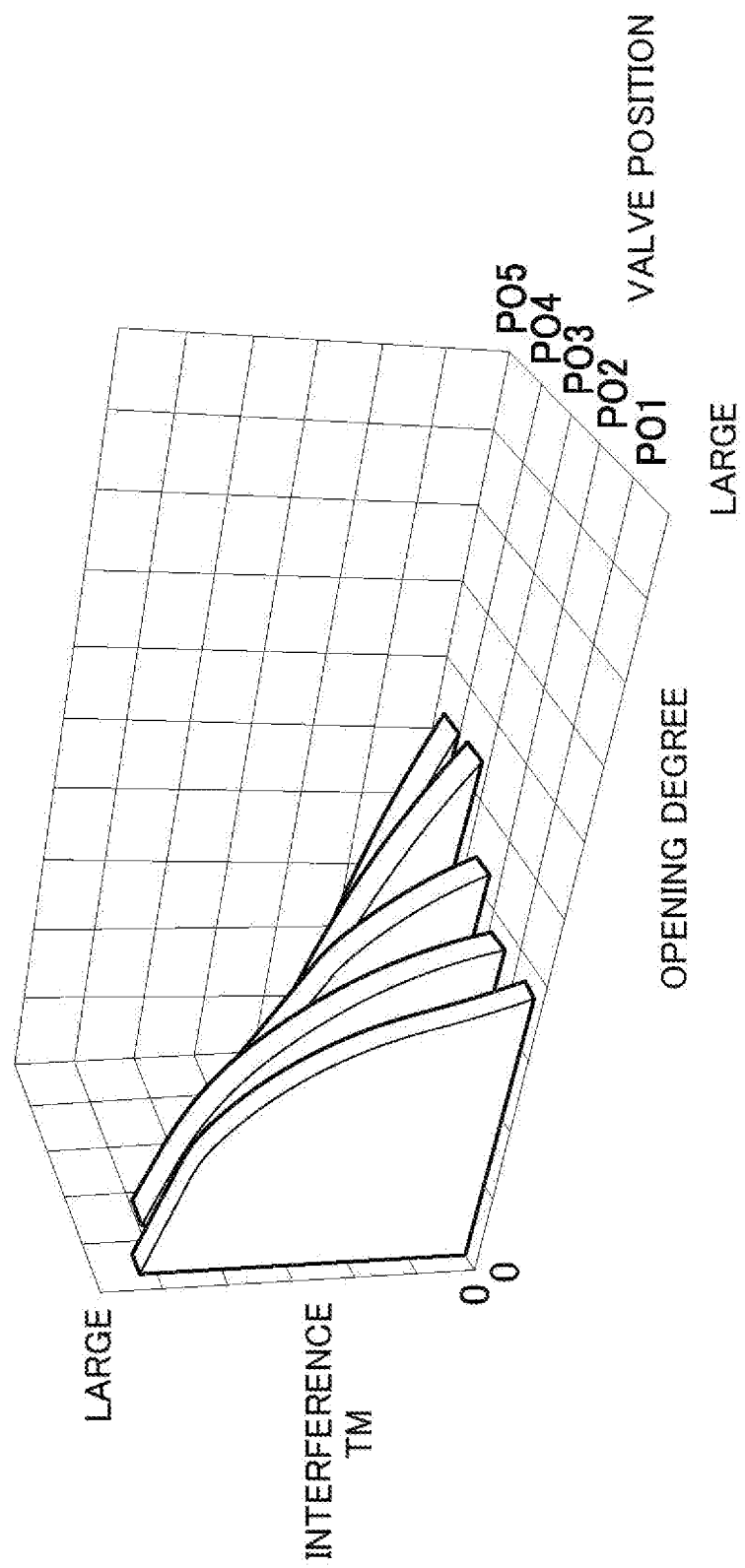
FIG. 12 is a diagram showing an interference with respect to a valve seat at each valve position in the second embodiment.

As shown in FIG. 12, the interference TM is thus gradually smaller at the valve positions PO1, PO2, PO3, PO4, and PO5 in this order. The interference TM is made minimum at the valve position PO5. As one example, during full closing (the opening degree is 0), the interference TM at the valve position PO5 is smaller by 0.05 mm than the interference TM for the valve element 14 having a perfect circular shape.

In the present embodiment, therefore, the interference TM can be set gradually smaller from the valve position PO1 toward the valve position PO5 along the circumferential direction of the valve element 14, so that the range of contact between the valve seat 13 and the valve element 14 during the valve opening/closing operation can be reduced from the valve position PO2 to the valve position PO5. This configuration can further reduce the sliding range of the valve seat 13 and the valve element 14, thereby enabling reduction in the sliding resistance which occurs between the valve seat 13 and the valve element 14.

In the present embodiment, furthermore, the interference TM at each of the valve positions PO1, PO2, PO3, PO4, and PO5 as shown in FIG. 12 is smaller than that in the comparative Example shown in FIG. 27. Thus, the whole-circumferential-open opening degree can be further reduced.

Figure 13:
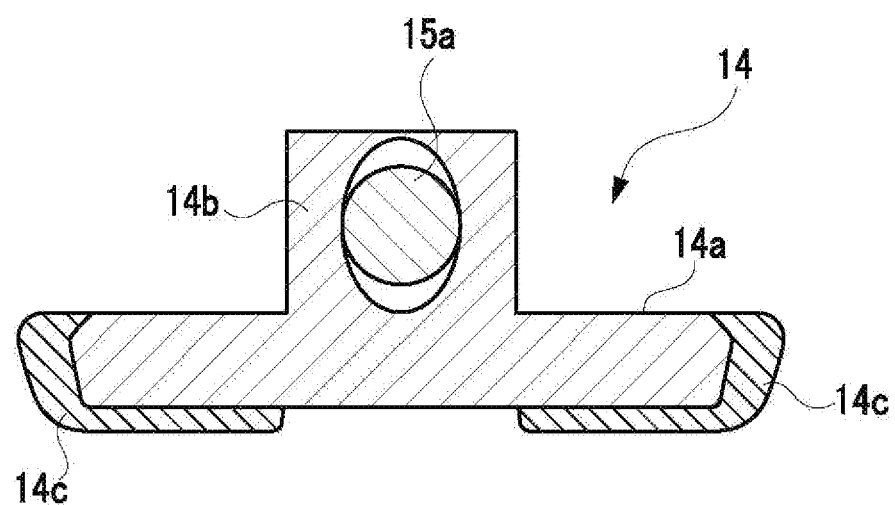
FIG. 13 is a diagram showing an example that the valve element is provided with a rubber seal part.

As an alternative, as shown in FIG. 13, the valve element 14 may be provided with a rubber seal part 14c, instead the valve seat 13 being provided with the rubber seal part 13a. In this case, the rubber seal part 14c includes the seal surface 18. Accordingly, the pipe section 12 (a body) and the valve seat 13 can be integrally molded. This configuration eliminates the need for mounting the valve seat 13 by press-fit into the pipe section 12 (the step portion 10) and hence saves the trouble of positioning the valve seat 13, resulting in cost reduction. Further, this configuration is free from the risk that a fluid leaks from a portion on which the valve seat 13 is mounted.

In the present embodiment, as a variation example, the valve element 14 may be further provided with a cutout portion as with the cut portion 31 in the first embodiment.

Third Embodiment

A third embodiment will be described hereinafter.

Example 1

First, Example 1 of the third embodiment will be described below. In this example, the rubber seal part 13a of the valve seat 13 is additionally provided with a groove 32 in a portion that will interact or interfere with the valve element 14. Specifically, as shown in FIG. 14, the groove 32 is formed in the seat surface 17 of the rubber seal part 13a of the valve seat 13. The groove 32 in the present example extends entirely in the circumferential direction of the valve seat 13. This groove 32 is located, entirely in the circumferential direction of the valve seat 13, at the same position in the direction of the central axis L3 of the valve hole 16.

Figure 15:
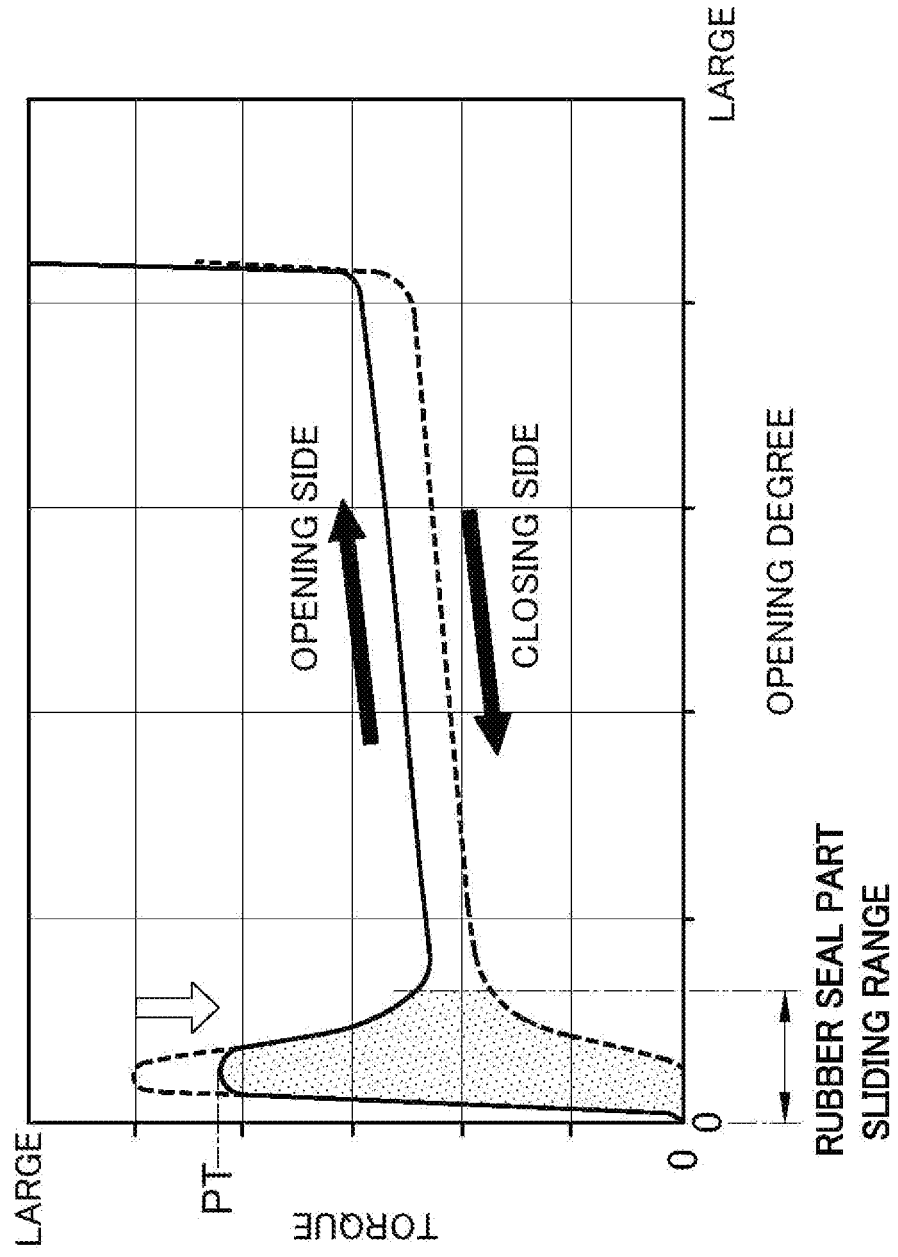
FIG. 15 is a view showing changes in magnitude of torque of a rotary shaft in Example 1 of the third embodiment.

This configuration can reduce the interference area S (see FIG. 14) of the rubber seal part 13a of the valve seat 13 with respect to the valve element 14 when the valve seat 13 and the valve element 14 contact each other. This can reduce the repulsive force of the rubber seal part 13a of the valve seat 13 to the valve element 14, leading to a reduction in sliding resistance which occurs between the valve seat 13 and the valve element 14. Such a configuration can reduce a peak torque (a maximum torque) of the rotary shaft 15 during a valve opening operation shown in FIG. 15 ("Toward Open" in the figure), leading to a reduction in sliding resistance which occurs between the valve seat 13 and the valve element 14. A sealing width δ of the valve seat 13 and the valve element 14 is ensured.

Figure 24:
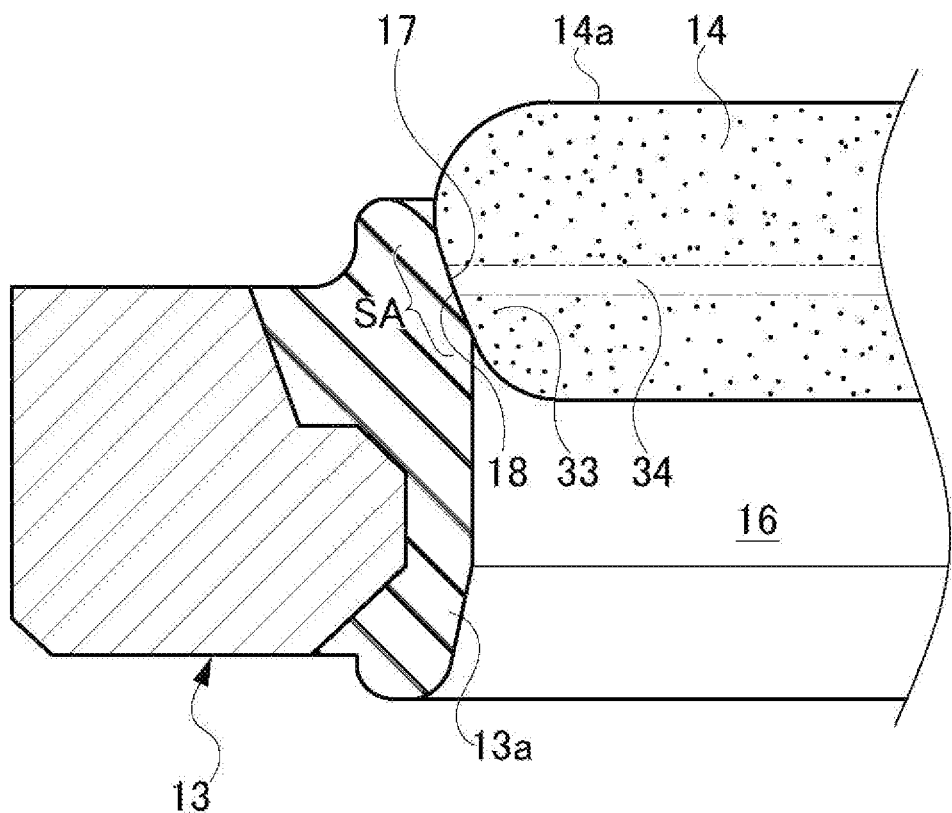
FIG. 24 is a cross-sectional view corresponding to the C-C cross section in FIG. 7, in which the valve element is illustrated in an external view, in Example 2 of a sixth embodiment.

The valve element 14 may be provided with a rubber seal part instead of the valve seat 13 being provided with the rubber seal part 13a, and a seal surface 18 of this rubber seal part of the valve element 14 may be formed with the groove 32. As an alternative, the groove 32 may be only formed partially in the circumferential direction of either the valve seat 13 or the valve element 14. As another alternative, a flat portion 34 may be provided within a sliding region SA of the valve seat 13 and the valve element 14, as shown in FIG. 24 which will be described later.

Example 2

Figure 16:
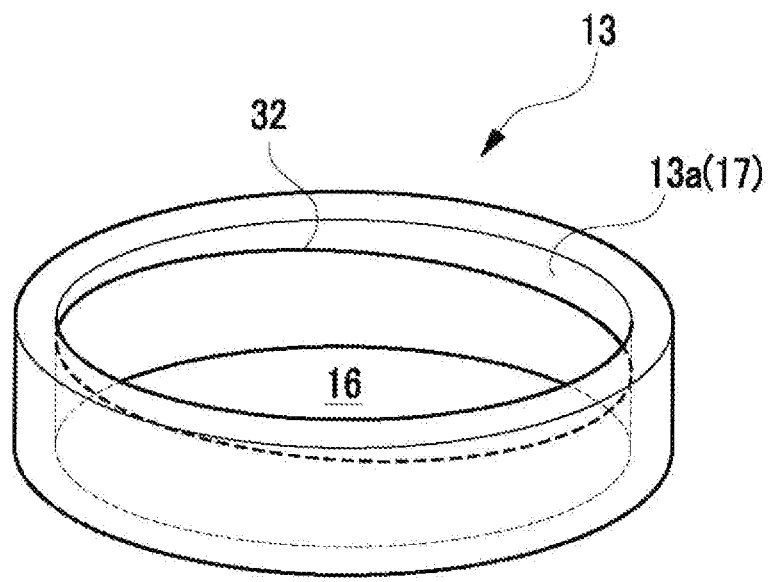
FIG. 16 is a schematic perspective view of a valve seat in Example 2 of the third embodiment, showing that the position of a groove varies with location in a circumferential direction of the valve seat.
Figure 17:
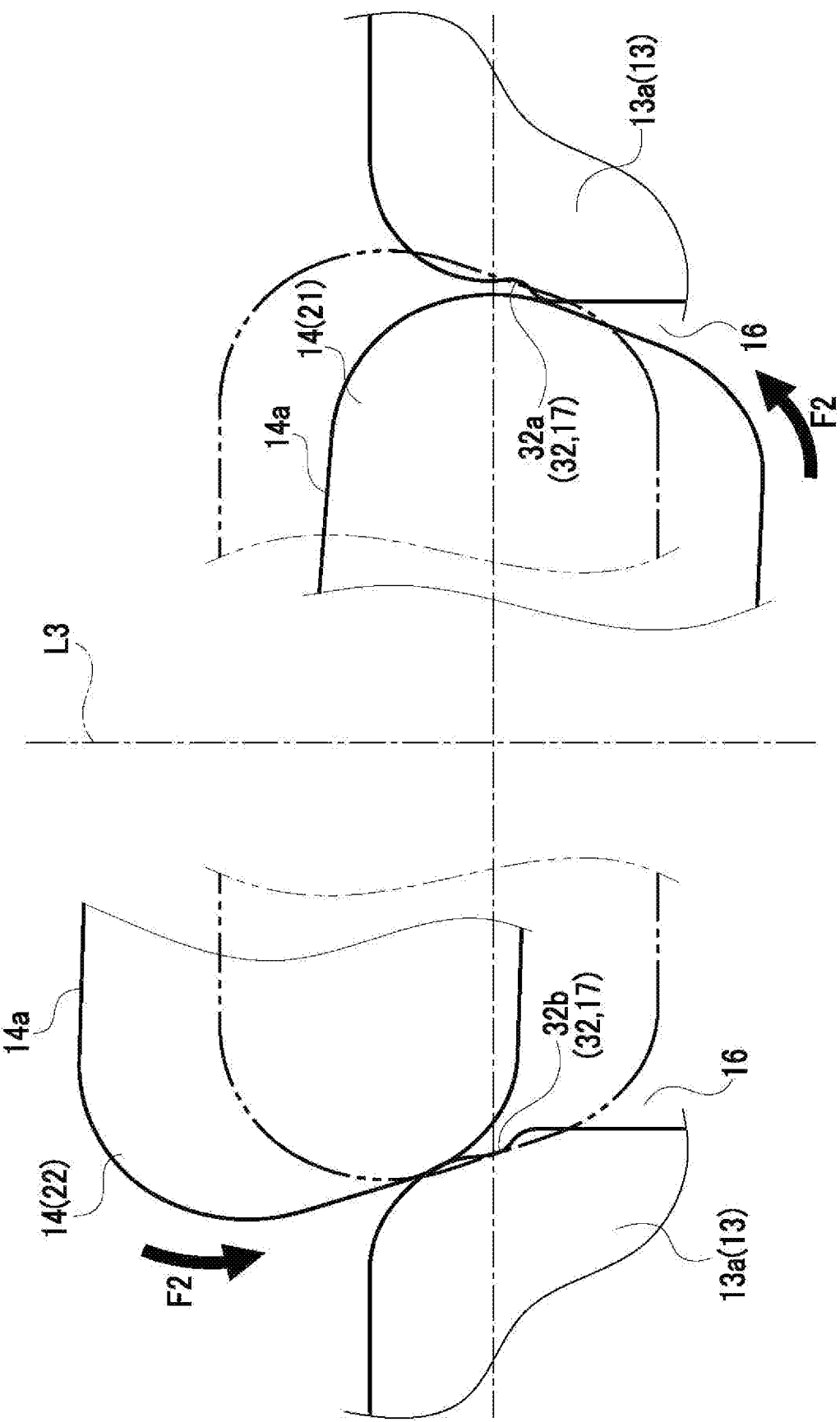
FIG. 17 is a view corresponding to the C-C cross-section and the D-D cross-section in FIG. 7 in Example 2 of the third embodiment.

Example 2 of the third embodiment will be described below. In this example, the position of the groove 32 varies with location in the circumferential direction of the valve seat 13. Specifically, the groove 32 extends entirely in the circumferential direction of the valve seat 13 as shown in FIGS. 16 and 17. A first portion 32a of the groove 32, located on a side where the first side part 21 of the valve element 14 slides, is placed at a position more inside the valve hole 16 (a lower side in FIG. 17, which is a side apart from the rotary shaft 15) in the central axis L3 of the valve hole 16 than a second portion 32b (located at a position indicated by a dashed-dotted line in FIG. 17) located on a side where the second side part 22 of the valve element 14 slides.

The position of the groove 32 varies with location in the circumferential direction of the valve seat 13 as described above. Accordingly, when the valve element 14 moves in a direction indicated by arrows F2 during the valve closing operation and the valve element 14 starts to contact with the rubber seal part 13a of the valve seat 13, the interference TM can be small. Specifically, at the time when the valve element 14 starts to contact with the rubber seal part 13a as indicated by solid lines in FIG. 17, the valve element 14 does not contact with the rubber seal part 13a at the first portion 32a of the groove 32, the interference TM can be small. Subsequently, a necessary interference TM can be obtained as indicated by a dashed-two dotted line in FIG. 17 during full closing. Thus, during valve closing operation, the sliding resistance which occurs between the valve seat 13 and the valve element 14 can be reduced before the fully closed state is reached. Even during valve opening operation, the sliding range of the valve seat 13 and the valve element 14 can be reduced, leading to a reduction in the sliding resistance which occurs between the valve seat 13 and the valve element 14.

The present example, as with the foregoing Example 1, can reduce the peak torque of the rotary shaft 15 and thus reduce the sliding resistance which occurs between the valve seat 13 and the valve element 14.

Fourth Embodiment

Figure 18:
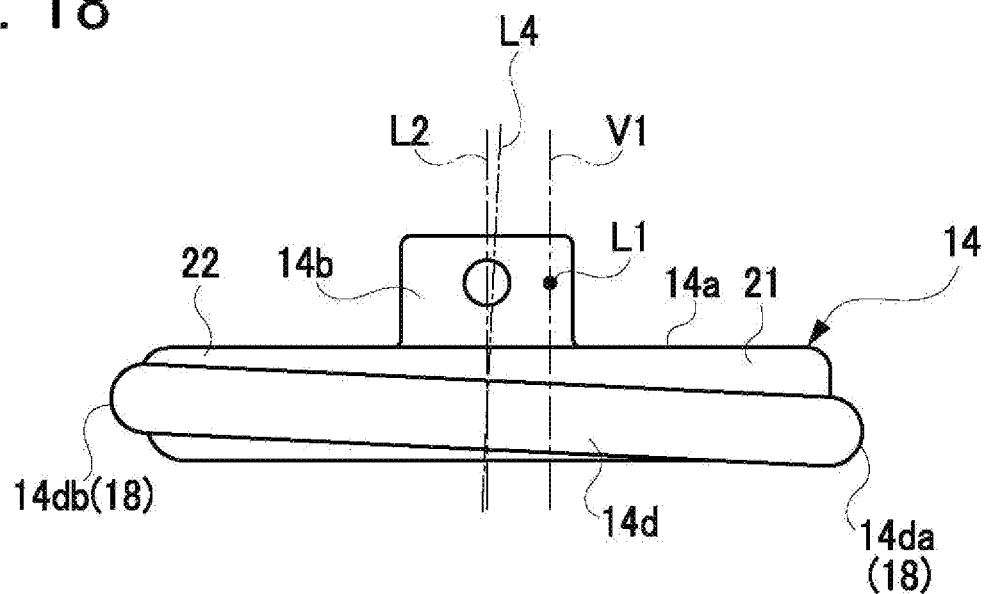
FIG. 18 is a side view of a valve element in a fourth embodiment.

A fourth embodiment will be described below. In this embodiment, the valve element 14 is provided with a rubber seal part 14d on an outer periphery of the valve element 14 in its radial direction as shown in FIG. 18. This rubber seal part 14d includes the seal surface 18. The rubber seal part 14d is obliquely attached to the valve element 14. Specifically, the rubber seal part 14d is attached on the outer periphery of the valve element 14 in its radial direction so that a central axis L4 of the rubber seal part 14d is oblique (at a slant) to the axis L2 of the valve element 14. The thickness of the rubber seal part 14d is constant over the circumferential direction of the rubber seal part 14d. Furthermore, as shown in FIG. 19, a second portion 14db of the rubber seal part 14d, located on a side close to the second side part 22 of the valve element 14, is placed at a position more outside in the valve hole 16 (the upper side in FIG. 19) in the direction of the axis L2 of the valve element 14 than a first portion 14da of the rubber seal part 14d located on a side close to the first side part 21 of the valve element 14.

Figure 19:
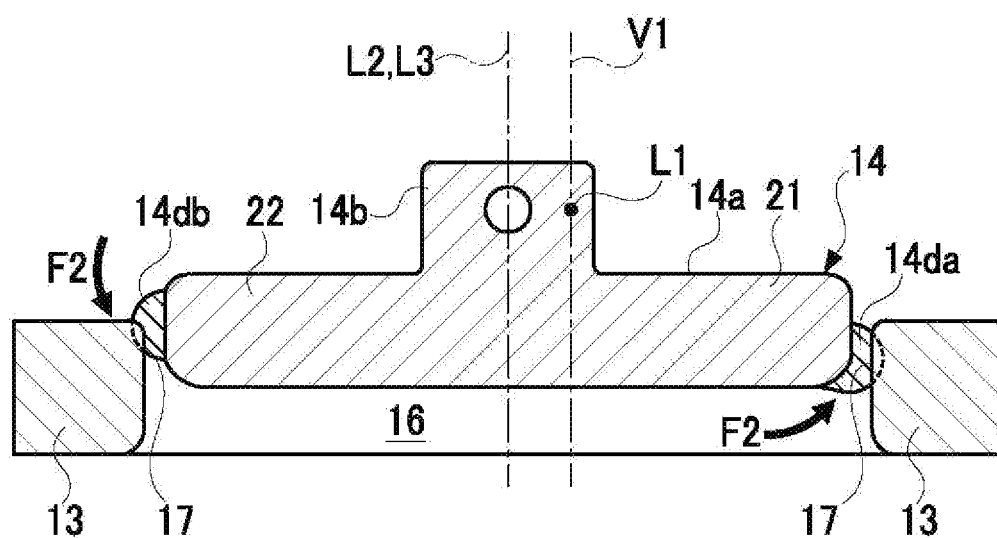
FIG. 19 is a cross-sectional view of the valve element and a valve seat during full closing in the fourth embodiment.

As shown in FIG. 19, the second portion 14db in the rubber seal part 14d configured as above enters into the valve hole 16 by a smaller amount during full closing is smaller than the first portion 14da of the rubber seal part 14d, and thus contacts with the valve seat 13 in a smaller amount during full closing than the first portion 14da. During valve opening/closing operation, the sliding range of the valve seat 13 and the valve element 14 (particularly, the sliding range of the valve seat 13 and the second portion 14db of the rubber seal part 14d) can be reduced. This enables a reduction in the sliding resistance which occurs between the valve seat 13 and the valve element 14.

Fifth Embodiment

Figure 20:
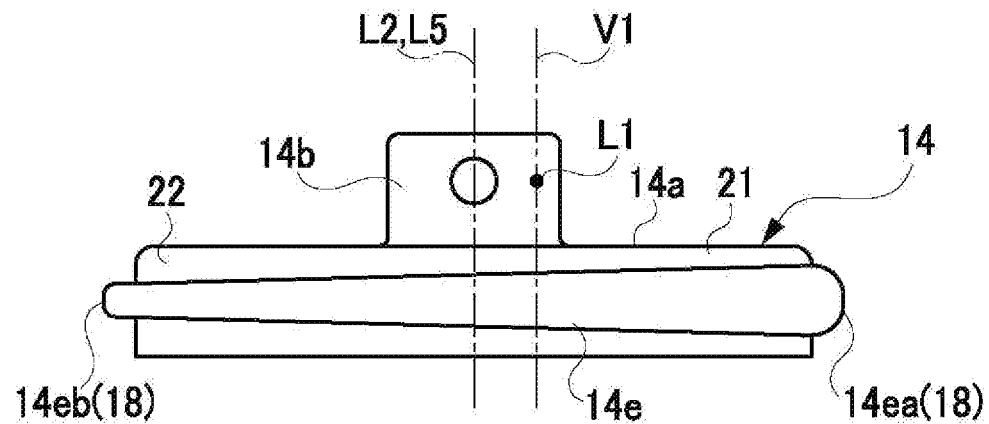
FIG. 20 is a side view of a valve element in a fifth embodiment.

A fifth embodiment will be described below. In this embodiment, the valve element 14 is provided with a rubber seal part 14e on an outer periphery of the valve element 14 in its radial direction as shown in FIG. 20. This rubber seal part 14e includes the seal surface 18. The rubber seal part 14e is attached to the outer periphery of the valve element 14 in its radial direction so that the central axis L5 of the rubber seal part 14e coincides with the axis L2 of the valve element 14. The rubber seal part 14e has a thickness that is thin on one side and thick on the other side. Specifically, a second portion 14eb of the rubber seal part 14e located on the side close to the second side part 22 is smaller in thickness in the central axis L5 of the rubber seal part 14e than a first portion 14ea of the rubber seal part 14e located on the side close to the first side part 21.

Figure 21:
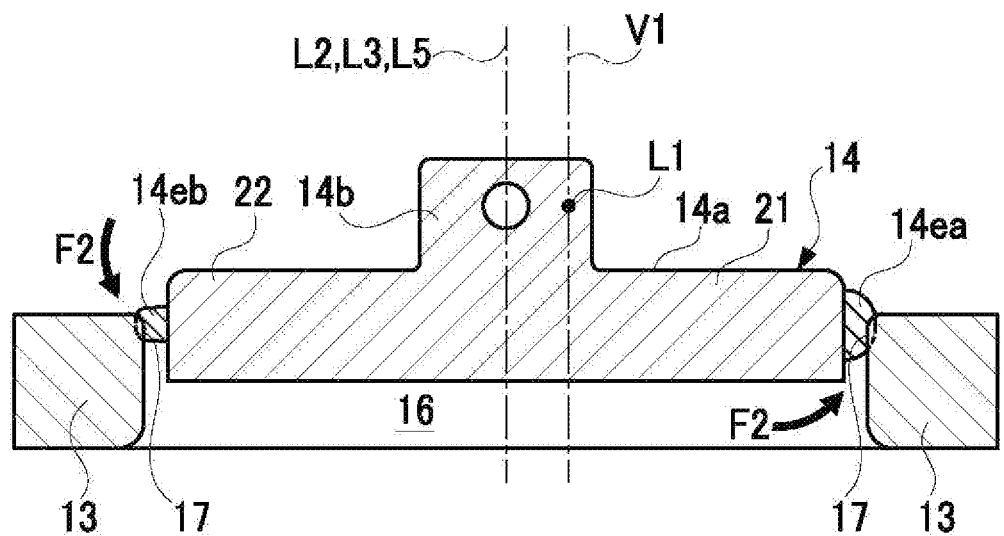
FIG. 21 is a cross-sectional view of the valve element and a valve seat during full closing in the fifth embodiment.

As shown in FIG. 21, the second portion 14eb of the rubber seal part 14e configured as above enters in the valve hole 16 by a smaller amount during full closing than the first portion 14ea of the rubber seal part 14e, and thus contacts with the valve seat 13 in a smaller area during full closing. During valve opening/closing operation, the sliding range of the valve seat 13 and the valve element 14 (particularly, the sliding range of the valve seat 13 and the second portion 14eb of the rubber seal part 14e) can be reduced. This enables a reduction in the sliding resistance which occurs between the valve seat 13 and the valve element 14.

Sixth Embodiment

A sixth embodiment will be described hereinafter.

Example 1

Figure 22:
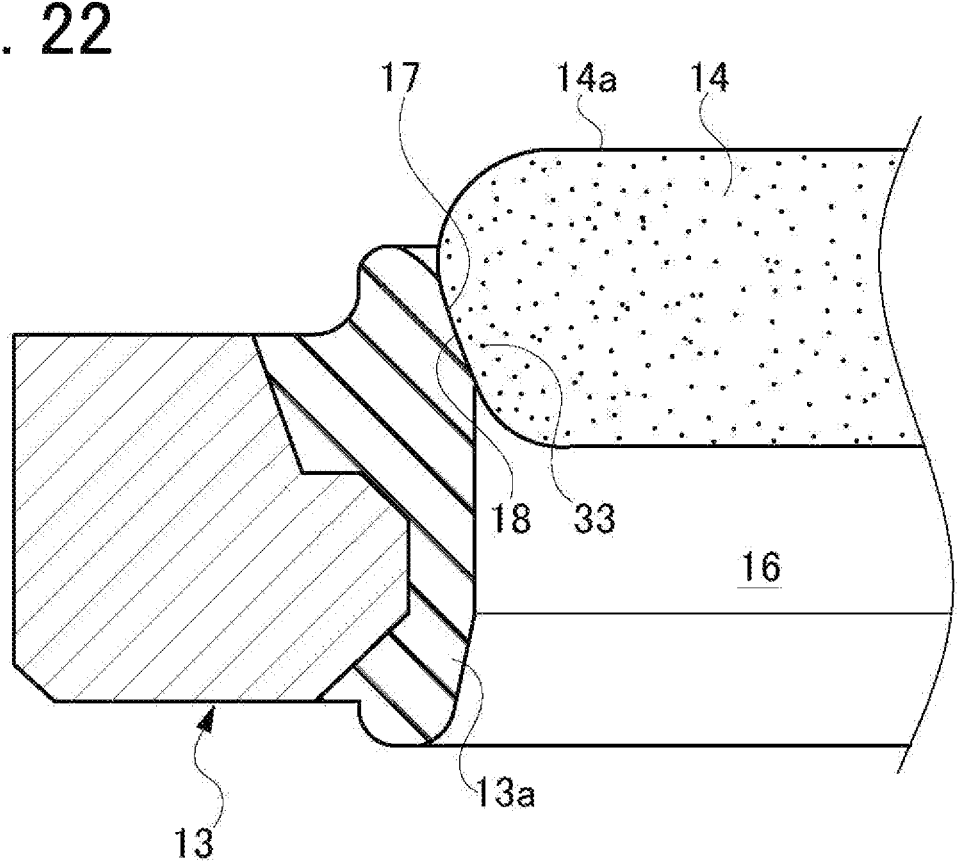
FIG. 22 is a cross-sectional view corresponding to the C-C cross section in FIG. 7, in which the valve element is illustrated in an external view, in Example 1 of a sixth embodiment.

First, Example 1 of the sixth embodiment will be described below. In this example, for the valve seat 13 provided with the rubber seal part 13a, the valve element 14 made of metal (e.g., stainless steel) provided with no rubber seal part is formed with asperities including a plurality of (countless) pits 33 formed on the seal surface 18 as shown in FIG. 22. The asperities (the pits 33) are made for example by shot blast applied to the outer peripheral surface of the valve element 14. This configuration can reduce the area of contact between the valve seat 13 and the valve element 14 in the fully closed state.

Figure 23:
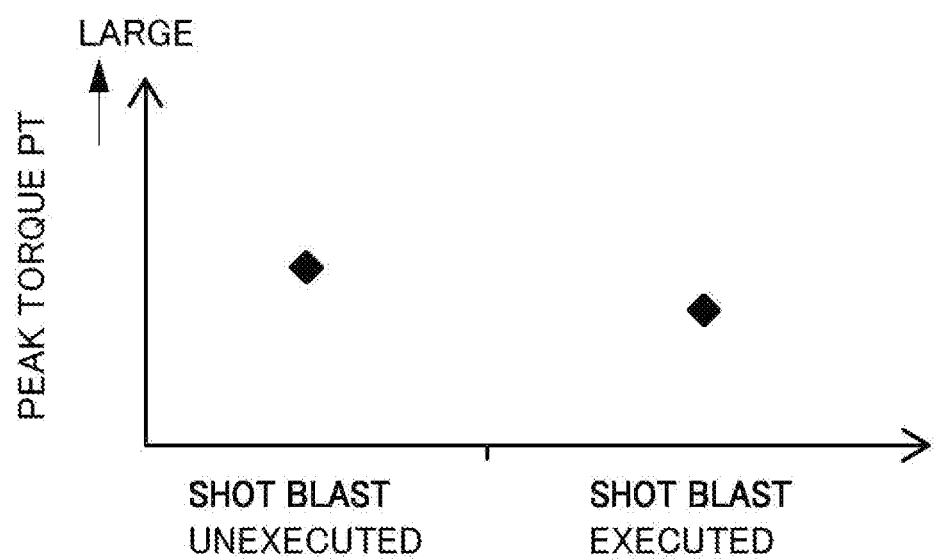
FIG. 23 is a graph showing peak torques obtained when shot blast has been executed and when shot blast has not been executed.

An analysis result of the present example reveals, as shown in FIG. 23, that a peak torque PT of the outer peripheral surface of the valve element 14 that was subjected to shot blast (the case of "Shot blast executed") becomes lower than a peak torque PT of the outer peripheral surface of the valve element 14 that was not subjected to shot blast (the case of "Shot blast unexecuted"). Since the seal surface 18 is formed with asperities by shot blast applied to the outer peripheral surface of the valve element 14, the peak torque PT can be reduced, leading to a reduction in the sliding resistance which occurs between the valve seat 13 and the valve element 14.

According to the present example described above, when the valve seat 13 is provided with the rubber seal part 13a, the metal valve element 14 provided with no rubber seal part is formed with the asperities on the seal surface 18.

This configuration can reduce the contact area between the valve seat 13 and the valve element 14 without changing the sealing width δ and the interference TM. This leads to a reduction in the sliding resistance which occurs between the valve seat 13 and the valve element 14.

As the request value for the sliding resistance of the valve element 14 to the valve seat 13 is lower (i.e., as the request for reducing the sliding resistance is stricter), more numerous asperities may be formed.

As a variation example, when the valve element 14 is provided with the rubber seal part, the valve seat 13 made of metal (e.g., aluminum) provided with no rubber seal part may be formed with the asperities on the seat surface 17. As another variation example, the valve seat 13 or the valve element 14 may be formed with the asperities only on the seat surface 17 or the seal surface 18 instead of over the whole outer peripheral surface of the valve seat 13 or the valve element 14.

Example 2

Example 2 of the sixth embodiment will be described below with a focus on differences of Example 1 of the sixth embodiment. In the present example, the valve element 14 is formed with the asperities on the seal surface 18 and a part of the seal surface 18 is formed with a flat portion 34 as shown in FIG. 24. Specifically, in axial cross-sections of the valve seat 13 and the valve element 14 (a cross-section taken along an axial direction) while the valve element 14 is in the fully closed position (in the fully closed state), the flat portion 34 is provided within a sliding region SA of the valve seat 13 and the valve element 14 as a region where the valve seat 13 and the valve element 14 come into linear contact with each other. Such a flat portion 34 is formed entirely in the circumferential direction of the valve element 14. This flat portion 34 can keep the sealing strength in the fully closed state. As a variation example, the valve seat 13 is formed with the asperities on the seat surface 17, a part of this seat surface 17 may be formed with the flat portion 34.

According to the present example described above, in axial cross-sections of the valve seat 13 and the valve element 14 in the fully closed state, the flat portion 34 is provided within the sliding region SA of the valve seat 13 and the valve element 14 as a region where the valve seat 13 and the valve element 14 come into linear contact with each other. In the fully closed state, accordingly, a fluid is blocked off by the flat portion 34 and thus can be prevented from leaking.

Example 3

Figure 25:
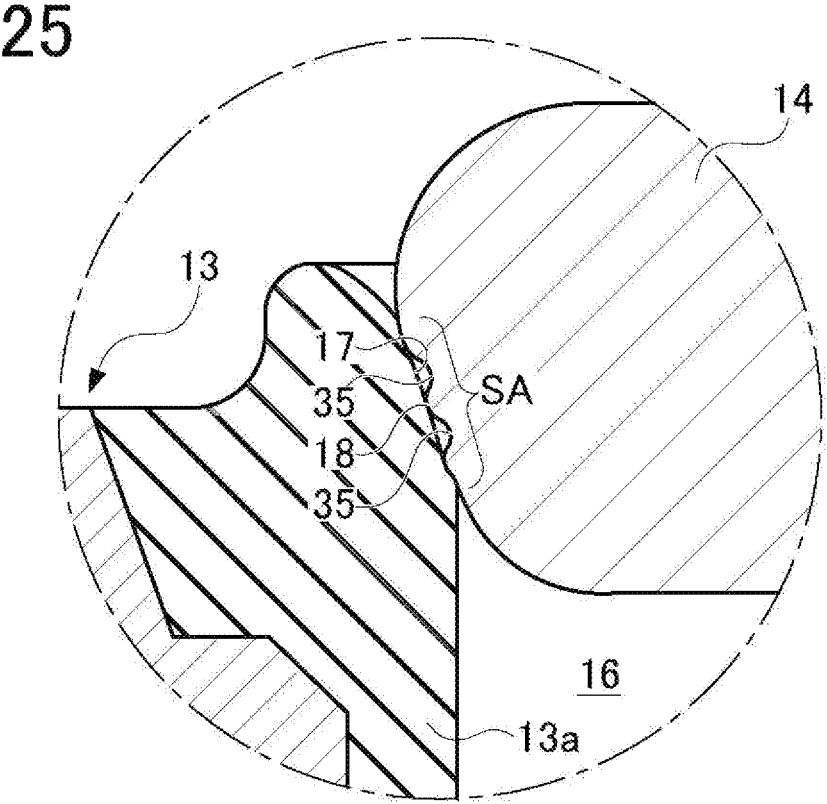
FIG. 25 is an enlarged cross-sectional view corresponding to the C-C cross-section in FIG. 7 in Example 3 of the sixth embodiment.

Further, Example 3 of the sixth embodiment will be described below. In this example, when the valve seat 13 is provided with the rubber seal part 13a, the metal valve element 14 provided with no rubber seal part is formed with two grooves 35 on the seal surface 18 as shown in FIG. 25. These grooves 35 are formed extending entirely in the circumferential direction of the valve element 14.

Such a seal surface 18 formed with the two grooves 35 provides a lower repulsive force than the seal surface 18 not formed with the grooves 35.

Figure 26:
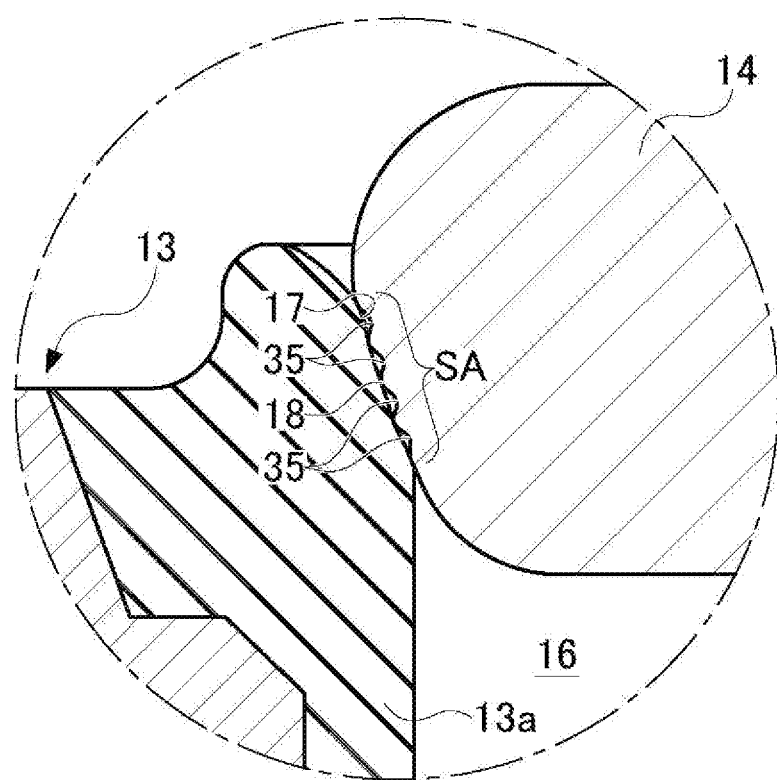
FIG. 26 is a view showing a variation example of Example 3 of the sixth embodiment.

The number of grooves 35 is not particularly limited and, for example, four grooves 35 may be formed on the seal surface 18 as a variation example shown in FIG. 26. This allows a reduction in the contact area between the valve seat 13 and the valve element 14 as compared with the seal surface 18 formed with two grooves 35. Thus, for example, it may be arranged such that two grooves 35 are formed on the seal surface 18 to give priority to enhancement of the sealing strength in the fully closed state, whereas four grooves 35 are formed on the seal surface 18 to give priority to reduction in the sliding resistance which occurs between the valve seat 13 and the valve element 14. That is, more numerous grooves 35 may be formed for a lower request value for the sliding resistance of the valve element 14 with respect to the valve seat 13.

According to the present example configured as above, when the valve seat 13 is provided with the rubber seal part 13a, the metal valve element 14 provided with no rubber seal part is formed with the grooves 35 on the seal surface 18.

This configuration can reduce the contact area between the valve seat 13 and the valve element 14 without changing the sealing width $\delta$ and the interference TM, leading to a reduction in the sliding resistance which occurs between the valve seat 13 and the valve element 14. For a rubber seal part formed with a groove(s), the accuracy of forming the groove(s) may be an issue. In the present example, however, the grooves 35 are formed on the seal surface 18 of the metal valve element 14, the accuracy of forming the grooves 35 can be enhanced.

As an alternative, more numerous grooves 35 may be formed for a lower request value for the sliding resistance of the valve element 14 with respect to the valve seat 13. When the grooves 35 are formed in large numbers to reduce the contact area between the valve seat 13 and the valve element 14 as above, the sliding resistance which occurs between the valve seat 13 and the valve element 14 can be reduced.

As a variation example, when the valve element 14 is provided with the rubber seal part, the metal valve seat 13 provided with no rubber seal part may include the groove(s) 35 on the seat surface 17. As another variation, the groove(s) 35 may be only formed partially in the circumferential direction of the valve seat 13 or valve element 14. The flat portion 34 (see FIG. 24) may be provided within the sliding region SA of the valve seat 13 and the valve element 14.

The foregoing embodiments are mere examples and give no limitations to the present disclosure. The present disclosure may be embodied in other specific forms without departing from the essential characteristics thereof.

For instance, the seat surface 17 of the valve seat 13 and the seal surface 18 of the valve element 14 may both be formed with a groove or grooves. Further, both the valve element 14 and the valve seat 13 may be provided with a rubber seal part. Alternatively, neither the valve element 14 nor the valve seat 13 may be provided with a rubber seal part. As an alternative, the seat surface 17 of the metal valve seat 13 or the seal surface 18 of the metal valve element 14, each including no rubber seal part, may be formed with both the asperities and the groove(s) 35.

REFERENCE SIGNS LIST

1 Flow control valve
2 Valve section
3 Motor section
13 Valve seat
13a Rubber seal part
14 Valve element
14c Rubber seal part
14d Rubber seal part
14da First portion
14db Second portion
14e Rubber seal part
14ea First portion
14eb Second portion
15 Rotary shaft
15a Pin
16 Valve hole
17 Seat surface
18 Seal surface
21 First side part
22 Second side part
31 Cut portion
32 Groove
32a First portion
32b Second portion
33 Pit
34 Flat portion
35 Groove
L1 Axis (of rotary shaft)
L2 Axis (of valve element)
L3 Central axis (of valve hole)
L4 Central axis (of rubber seal part)
L5 Central axis (of rubber seal part)
V1 Virtual plane
PO1, PO2, PO3, PO4, PO5 Valve position
TM Interference
S Interference area
PT Peak torque
$\delta$ Sealing width
SA Sliding region

The invention claimed is:

1. A double eccentric valve comprising:

a valve seat including a valve hole and an annular seat surface formed along an edge of the valve hole;

a valve element having a circular disc shape and including an outer periphery formed with an annular seal surface corresponding to the seat surface; and a rotary shaft configured to rotate the valve element, the rotary shaft having an axis that extends in parallel with a radial direction of the valve element and the valve hole, the rotary shaft being positioned eccentrically from a center of the valve hole in a radial direction of the valve hole, the seal surface being positioned eccentrically from the axis of the rotary shaft toward an extending direction of an axis of the valve element, and the valve element being configured to rotate about the axis of the rotary shaft to move between a fully closed position where the seal surface is in surface contact with the seat surface and a fully open position where the seal surface is furthest away from the seat surface, wherein the valve element includes a first side part and a second side part divided by a boundary defined by a virtual plane extending from the axis of the rotary shaft in parallel with an extending direction of the axis of the valve element, when the valve element is rotated in a valve closing direction, the first side part rotates from an inside toward an outside of the valve hole while the second side part rotates from the outside toward the inside of the valve hole, the valve element is provided with a rubber seal part including the seal surface, a portion of the rubber seal part located close to the second side part is configured to enter in the valve hole by a smaller amount during full closing than a portion of the rubber seal part located close to the first side part, the rubber seal part is attached to an outer periphery of the valve element in the radial direction so that a central axis of the rubber seal part is oblique to the axis of the valve element, and a portion of the rubber seal part located close to the second side part is formed at a position more outside in the valve hole during full closing in a direction of the axis of the valve element than a portion of the rubber seal part located close to the first side part.

* * * * *